United States Patent [19]
Das et al.

[11] Patent Number: 5,377,215
[45] Date of Patent: Dec. 27, 1994

[54] EXCIMER LASER

[75] Inventors: Palash P. Das, Vista; Donald G. Larson, San Diego, both of Calif.

[73] Assignee: Cymer Laser Technologies, San Diego, Calif.

[21] Appl. No.: 975,652

[22] Filed: Nov. 13, 1992

[51] Int. Cl.⁵ ............................................. H01S 3/225
[52] U.S. Cl. ........................................ 372/57; 372/34; 372/58; 372/59
[58] Field of Search ............................... 372/34–36, 372/38, 55, 57, 58, 59

[56] References Cited

U.S. PATENT DOCUMENTS

| | | | |
|---|---|---|---|
| 4,007,430 | 2/1977 | Fletcher et al. | 372/55 X |
| 4,229,709 | 10/1980 | McMahan | 372/59 |
| 4,502,145 | 2/1985 | Allen et al. | 372/38 |
| 4,547,885 | 10/1985 | Allen et al. | 372/58 |
| 4,611,327 | 9/1986 | Clark et al. | 372/58 |
| 4,661,958 | 4/1987 | Bowes et al. | 372/34 |
| 4,707,837 | 11/1987 | Bennett et al. | 372/34 |
| 4,760,583 | 7/1988 | Sasnett et al. | 372/36 X |
| 4,959,840 | 9/1990 | Akins et al. | 372/57 |
| 4,977,573 | 12/1990 | Bittenson et al. | 372/58 X |
| 5,138,627 | 8/1992 | Friede et al. | 372/38 X |
| 5,149,659 | 9/1992 | Hakuta et al. | 372/59 X |

Primary Examiner—John D. Lee
Attorney, Agent, or Firm—Ellsworth R. Roston; Charles H. Schwartz

[57] ABSTRACT

A housing in a laser system encloses a cathode and a displaced anode and gases ionizable and reactive chemically when a voltage pulse produces a cathode-anode electrical discharge. Moving air cools the components (capacitors, thyratron and triggering circuitry) for producing the voltage pulses. The laser gas temperature is continuously regulated at a particular value whether or not there is an electrical discharge. The concentration of one of the gases in the chamber is regulated to values alternately on opposite sides of an optimal value to provide an optimal energy in each chemical reaction of the gases. The gases are recirculated as by a fan driven on a shaft by a pair of motors and are filtered during such recirculation. The shaft speed is regulated at a particular value and the motor currents are regulated to be equal. Any ozone formed in a compartment holding the high voltage terminals is purged by passing a neutral gas (nitrogen) through the compartment to the atmosphere. The neutral gas is passed into the housing through a hose which also holds a high voltage wire in insulated relationship to other electrical components. A collar arrangement at one wire end provides for the introduction of voltage from the collar to the anode of the thyratron with the hose coupled to the housing and grounds the collar with the wire decoupled from the housing. The different high voltage components are sequentially tested for their operability by a system and method unique to this invention.

97 Claims, 13 Drawing Sheets

FIG. 5
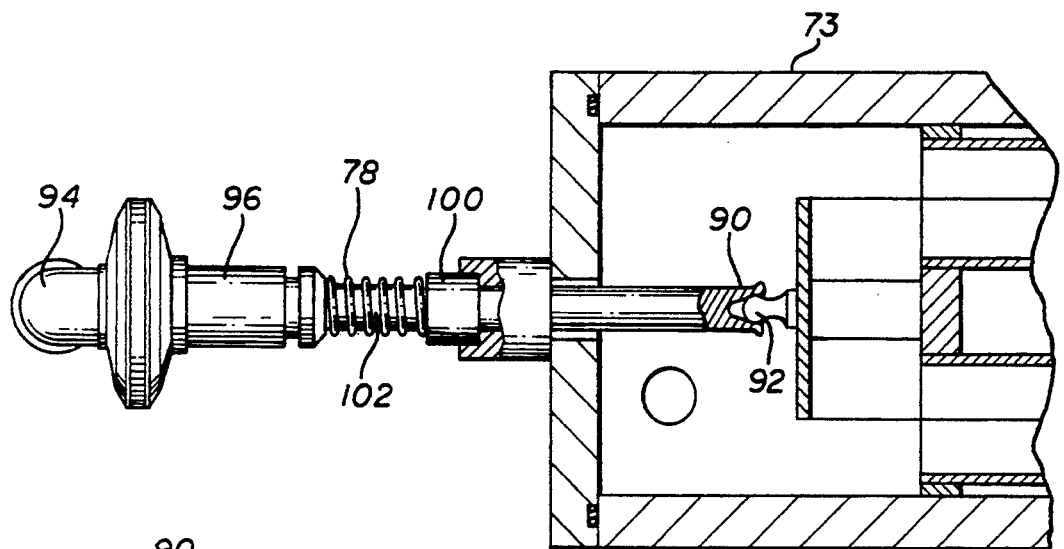
FIG. 6
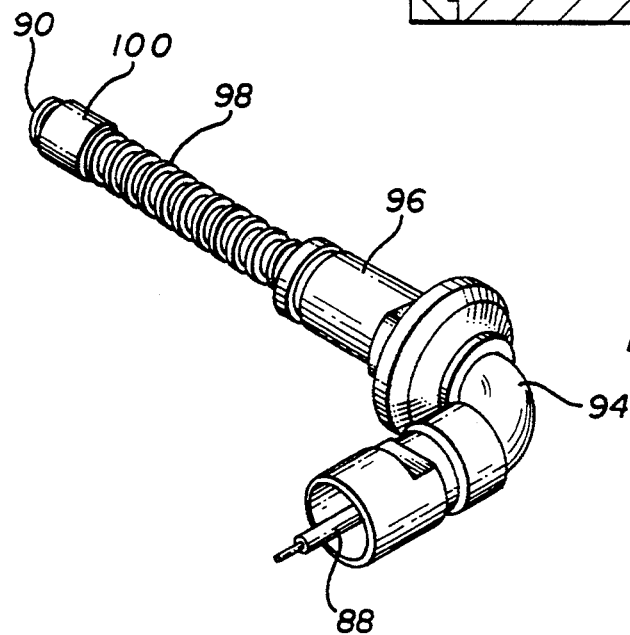
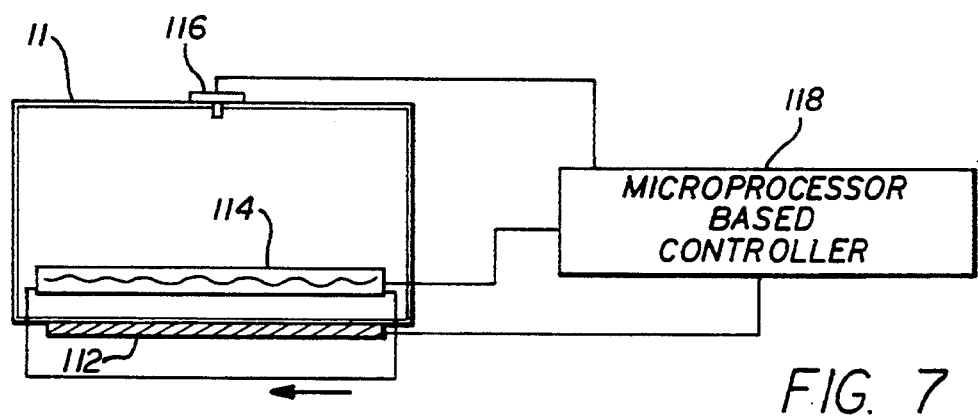
FIG. 7

SUB-PROGRAM PERTURB

LASER DIAGNOSTICS

EXCIMER LASER

This invention relates to lasers and more particularly to lasers such as excimer lasers which operate more efficiently than lasers of the prior art. The invention particularly relates to moderate power lasers such as excimer lasers.

Lasers have many uses. For example, lasers are used to repair torn retinas in eyes and to perform other eye operations such as to reshape the cornea of the eye for correcting for defects in vision. Lasers are also used for other functions in the human body such as to remove plaques in heart arteries. Lasers are also used to cut holes at precise positions in semiconductor wafers.

In some gas discharge lasers, a cathode and an anode are disposed in spaced relationship in a housing. When a voltage pulse is applied between the cathode and the anode, an electrical discharge is produced between the cathode and the anode. The electrical discharge causes gases in the housing to become ionized and to react chemically upon ionization. For example, krypton and fluorine react chemically to produce krypton fluoride (KrF). The chemical reaction produces radiation energy at a particular frequency.

Although lasers now in use have an ever expanding number of functions in a progressively increasing number of fields, such lasers have certain inherent limitations. This is particularly true of lasers which provide moderate to large amounts of power. For example, the following limitations exist in lasers, particularly in those providing moderate or large amounts of power:

1. High voltage components such as capacitors, thyratrons and boards for providing a controlled triggering of the thyratrons are included in the lasers to produce a high voltage (e.g. 20 Kilovolts) which is introduced to the cathode to initiate the production of the voltage pulses between the cathode and the anode. Such components are not adequately cooled in prior art lasers.

2. The gases in the housing are continuously passed from the housing, filtered and then re-introduced into the housing. Attempts have been made to regulate the temperature of the gases in the housing. Such attempts have not been entirely successful. One reason has been that the temperature of the gases has been regulated only when the voltage pulses have been produced. Another reason has been that the housing has not been uniform. This has prevented the temperature of the gases from being stabilized at an optimal value to enhance the ionization and chemical reaction of the gases in the housing.

3. It would be desirable to maintain the output energy from the laser at an optimal level. This in turn would cause the radiation energy in each pulse to be at an optimum level and the efficiency of the laser to be at an optimal level. This has not occurred in the prior art.

4. The terminals for introducing the high voltage to the cathode are disposed in a separate compartment. The high voltage in the compartment produces a corona discharge and the corona discharge in turn produces ozone. The ozone is deleterious to the components, particularly the insulating members, in the compartment. It would accordingly be desirable to prevent the ozone from having any deleterious effects.

5. The motor and the fan for recirculating the gases from the housing through the filter and back to the housing are quite large. It would be desirable to provide motors of reduced size but still provide an optimal efficiency in their operation.

6. The introduction of the high voltage into the laser and to the anode in the laser has to be done carefully to avoid problems with the high voltage. Furthermore, when the voltage lines are not coupled into the housing and are separated from the housing, assurance has to be provided that the high voltage lines are grounded.

7. When there has been a decrease in the output energy of a laser, random—not systematic—tests have been performed on the laser. Since these tests have been random and not systematic, a determination of the cause of the failure to introduce high voltage pulses to the cathode has generally been made only after much trial and tribulation. Furthermore, specially trained personnel have been required to make such tests.

In one embodiment of the invention for use with a moderate or high power laser such as an excimer laser, a housing encloses a cathode and a displaced anode and gases ionizable and reactive chemically when a voltage pulse produces an electrical discharge between the cathode and the anode. Moving air cools the components (capacitors, thyratron and triggering circuitry) for producing the voltage pulses. The temperature of the laser gases is continuously regulated at a particular value and is additionally regulated upon the production of each electrical discharge voltage pulse.

The concentration of one of the gases in the chamber is regulated to values alternately on opposite sides of an optimal value to provide an optimal energy in each chemical reaction of the gases. The gases are recirculated as by fans driven on a shaft by a pair of motors and are filtered during such recirculation. The shaft speed is regulated at a particular value and the motor currents are regulated to be equal.

Any ozone formed in a compartment holding the high voltage terminals is purged by passing a neutral gas (nitrogen) through the compartment to the atmosphere. The neutral gas is passed into the housing through a hose which also holds a high voltage wire in insulated relationship to other electrical components. A collar arrangement at one wire end provides for the introduction of voltage from the collar to the anode of the thyratron with the hose coupled to the housing and grounds the collar with the wire decoupled from the housing.

The different high voltage components are sequentially tested for their operability by a system and method unique to this invention. A microprocessor based controller interrogates the several suitably located diagnostics in the laser in the event of a less than expected laser energy pulse. The malfunctioning components can then be immediately identified.

In the drawings:

FIG. 4 is an end elevational view of the laser from an external position and shows a window for passing energy radiation produced in the laser and further shows apparatus for recirculating and filtering gases in the housing;

FIG. 5 is an enlarged fragmentary view, partially in section, of an arrangement in coupled relationship to the compartment above the housing of the laser for introducing inert gases into such compartment and for introducing high voltages into the compartment for introduction to the anode of a thyratron;

FIG. 6 is an enlarged fragmentary perspective view of components in the arrangement shown in FIG. 5 but with the components decoupled from the housing shown in FIG. 4;

FIG. 7 is a schematic view of a subsystem for regulating the temperature of the gases in the housing at a particular value whether or not there is an electrical discharge in the housing;

In one embodiment of the invention, a laser generally indicated at 10 may have a construction generally corresponding to that disclosed in U.S. Pat. No. 4,959,840 issued on Sep. 25, 1990, to Robert P. Akins, Donald G. Larson, Uday K. Sengupta and Richard L. Sandstrom for a "Compact Excimer Laser Including an Electrode Mounted in Insulating Relationship to Wall of the Laser" and assigned of record to the assignee of record of this application. U.S. Pat. No. 4,959,840 is intended to be used to complete any disclosure if such should be necessary.

Figure 1:
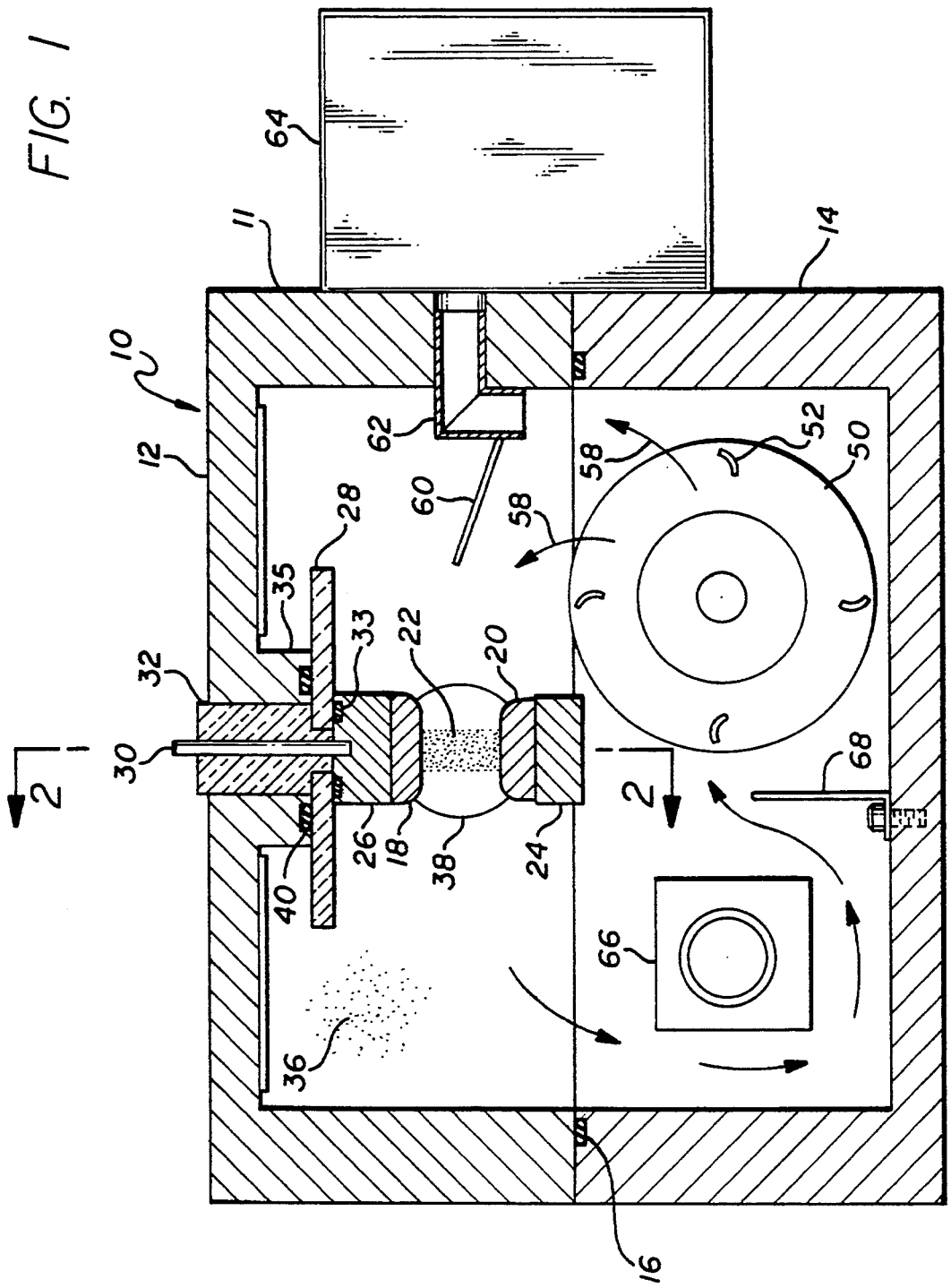
FIG. 1 is a schematic end sectional view showing certain components in a laser constituting one embodiment of the invention and particularly showing a housing holding a cathode and an anode and gases in the housing.
Figure 2:
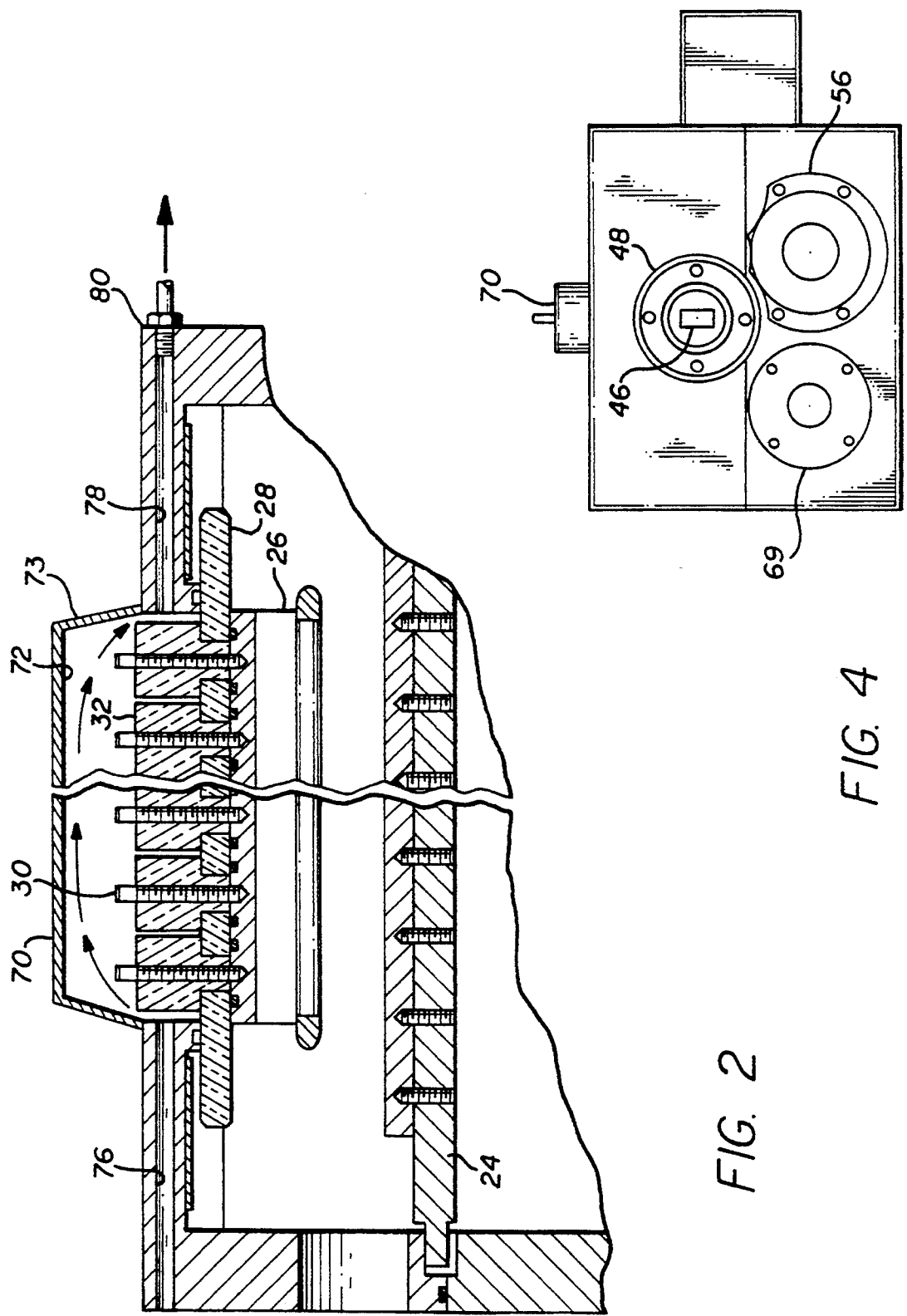
FIG. 2 is an enlarged fragmentary sectional side elevational view taken substantially on the line 2—2 of FIG. 1 and shows a compartment and components in the compartment for introducing a high voltage to the cathode.

The laser 10 includes a housing 11 (FIG. 1) formed from a pair of half members 12 and 14. The half members 12 and 14 are coupled and sealed as by an "O" ring seal 16 which extends around the perimeter of the housing 11. FIG. 1 shows the interior of the laser 10 from an end elevational view and FIG. 2 illustrates the top portion of the laser from a side elevational view.

A cathode 18 and a grounded anode 20 (FIGS. 1 and 2) are disposed in spaced relationship within the housing 11. The cathode 18 and the anode 20 may be formed from suitable high purity metals so as to minimize the erosion of the metals and to avoid contaminating the laser gases with erosion products which may be formed. An electrical discharge area schematically illustrated at 22 is disposed between the cathode 18 and the anode 20. The electrical discharge in the area 22 is produced by a high voltage pulse such as in the order of twenty Kilovolts (20 kV) impressed on the cathode 18.

A base member 24 (FIGS. 1 and 2) made from a suitable conducting material supports the anode 20. A conductive member 26 contacts the cathode 18. The conductive member 26 is disposed adjacent a main insulator plate 28. The main insulator plate 28 separates and insulates threaded metal rods 30 (FIG. 2) from one another. The threaded rods 30 engage the conductive member 26 to introduce the high voltage to the cathode 18. The threaded rods 30 extend through insulating bushings 32 made from a suitable material such as a ceramic.

The upper housing member 12 includes downwardly extending wall portions 35 so that the main insulator plate 28 is spaced from the upper wall of the housing member 12. "O" rings 33 (FIG. 1) are disposed in recesses in the conductive member 26 on one side of the main insulator plate 28 and "O" rings 35 are disposed in recesses on the other side of the main insulator plate 28 so that the central portion of the main insulator plate 28 is held in compression between the "O" rings. The main insulator plate 28 electrically insulates the cathode 18 from the walls of the housing member 11 and thereby insures that a proper electrical discharge occurs between the cathode 18 and the anode 20.

When a high voltage is applied to the cathode 18 through the connector rods 30 and the conductive member 26, an electrical discharge is produced in the region 22 between the cathode and the anode 20. This electrical discharge ionizes gases 36 in the vicinity of the area 22 and causes these gases to react chemically. For example, the gases 36 may be Krypton (Kr) and fluorine ($F_2$). The Krypton and the fluorine react chemically to produce Krypton fluoride (KrF). The gases in the vicinity of the area 22 are located primarily in a region defined schematically as 38 in FIG. 1.

The formation of the Krypton fluoride produces energy radiation in a very narrow band of wavelengths such as in the excimer range. This light is directed to an optical element such as a window 46 (FIG. 4) at one end (or to a mirror adjacent the window) and to a corresponding optical element at the other end. The energy radiation is reflected between the opposite optical elements and is reinforced in each reflection. A portion of the energy radiation moving in each cycle between the opposite optical elements passes through one of the optical elements such as the optical element 46. The energy radiation passing through the optical element 46 such as the window has a narrow band of frequencies and has a high intensity and a narrow width. The optical element 46 and the optical element at the other end may be made from a suitable material such as a magnesium fluoride which is transparent in deep ultraviolet light. The optical element 46 may be included in a window structure 48 shown in FIG. 4.

The gases 36 in the housing 11 are withdrawn from the housing and are recirculated in a closed loop and introduced back into the housing. Preferably this recirculation is provided through a number of cycles during the period between the introduction of successive voltage pulses to the cathode 18. During such recirculations, debris is removed from the gases 36 as by filtering the gases. The debris may be produced as a result of the electrical discharges between the cathode 18 and the anode 20.

The recirculation of the gases 36 may be provided by a fan 50 (FIG. 1) having blades 52. A cap 56 in FIG. 4 provides a support for the fan 50 and the motors driving the fan. As shown by arrows 58 in FIG. 1, the fan 50 drives the gases 36 upwardly in FIG. 1 through the electrical discharge area 22. This movement is facilitated by a vane 60. A gas scoop 62 provides for a portion of the gases 36 to be siphoned from the housing 11 for filtering by a filter 64. The filter 64 may be constructed as shown and disclosed in U.S. Pat. No. 4,959,840. The filter 64 removes the debris (foreign matter) or contaminants from the gases 36.

After filtering, the gases 36 are returned into the housing 11. A portion of the clean gases from the filter 64 may be moved past the optical element 46 and the optical element at the other end to clean the optical elements. Apparatus for cleaning the optical element 46 and the other optical element is fully disclosed in U.S. Pat. No. 4,959,840. Alternatively, the apparatus for cleaning the window may be as disclosed and claimed in application Ser. No. 07/975,385 filed on Nov. 12, 1992, by Robert P. Akins for "Apparatus, and Method of, Maintaining a Clean Window in a Laser" and assigned of record to the assignee of record of this application.

The gases 36 are heated considerably by the electrical discharge between the cathode 18 and the anode 20. It is desirable, however, that the gases 36 should not remain heated. The gases remaining in the housing 11 are accordingly cooled by a water cooled heat exchanger 66 in FIG. 1. The cooled gases are forced upwardly as by a vane 68. These gases accordingly move to the fan 50 for circulation into the electric discharge area 22. An end cap 69 in FIG. 4 may be provided to support the heat exchanger 66.

Walls 70 extend upwardly from the housing member 12 to define a compartment 72 (FIG. 2) in communication with the interior of the housing 11. The conductor rods 30 and the insulating bushings 32 are disposed in the compartment 72. Since the conductor rods 30 receive a high voltage in the order of approximately twenty thousand volts (20 kV), a corona discharge tends to occur in the compartment 72. This corona discharge tends to produce ozone which in turn produces a deterioration in the insulating properties of the bushings 32 and the main insulator plate 28. The performance of the laser 10 is affected by this deterioration in the insulating properties of the bushings 32 and the main insulator plate 28.

Figure 3:
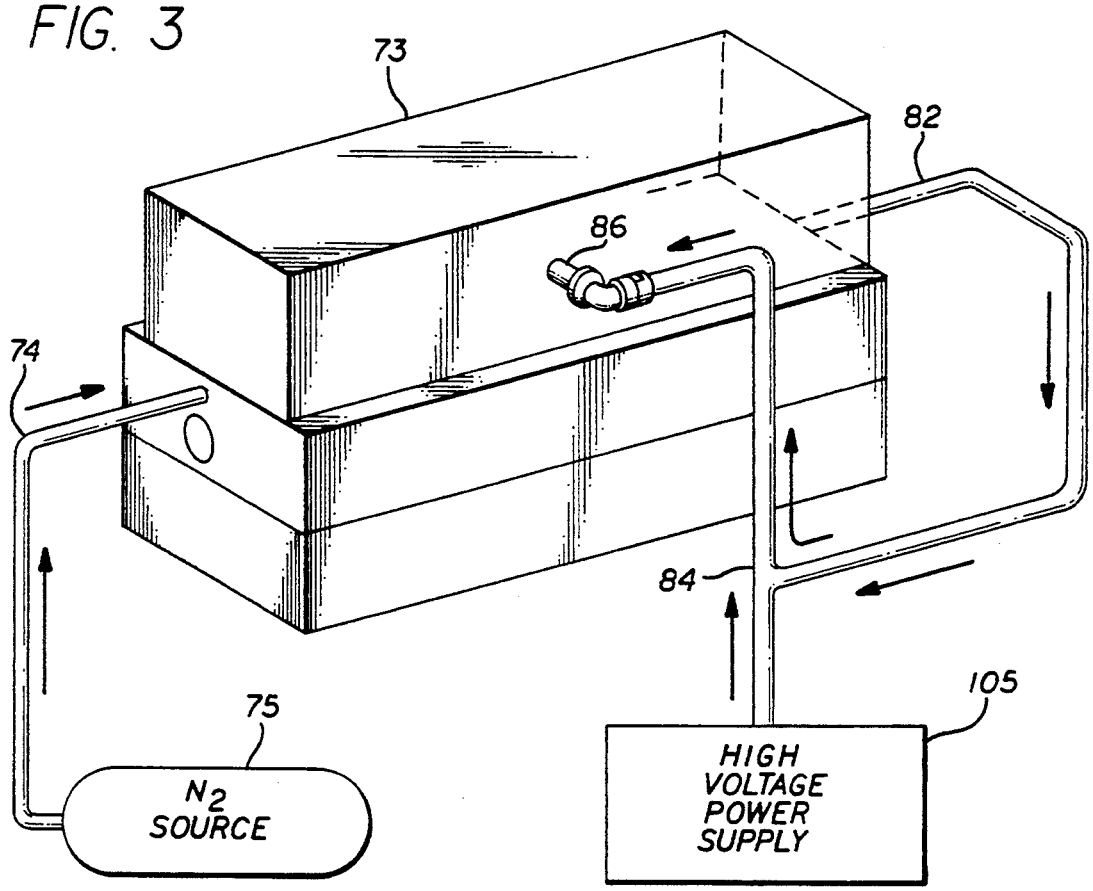
FIG. 3 is a schematic perspective view showing the housing for the laser and further showing the introduction of an inert gas (nitrogen) and a high voltage into a compartment above the housing.

To prevent the ozone from producing any deterioration in the bushings 32 and the main insulator plate 28, an inert gas such as nitrogen is circulated through the compartment 72. As the inert gas moves from the compartment 72, it carries the ozone with it, thereby removing the ozone from the compartment immediately after the ozone is formed. The inert gas such as nitrogen is introduced into the housing 11 through a hose 74 from a source 75 (FIG. 3). The inert gas then flows into the compartment 72 through a conduit 76 at the upper end of the housing member 12. The flow of the inert gas through the compartment 72 is indicated by arrows at the upper end of the compartment 72. The compartment 72 is defined by a housing 73 above the housing 11.

The inert gas then flows through a conduit 78 (FIG. 2) in the housing member 12 and a fitting 80 (FIG. 2) into one of end of a hose 82 (FIG. 3). The hose 82 communicates with one end of a hose 84. The other end of the hose 84 is extended through a fitting 86 (FIG. 3) made from an insulating material. The inert gas is then exhausted to the atmosphere. The exhaustion of the inert gas to the atmosphere does not have any deleterious effect since the atmosphere is composed primarily of nitrogen.

A high voltage wire 88 (FIG. 6) is centered in the hose 84 (FIG. 3) and is electrically insulated in the hose by the coaxial insulating material on the wire and by the inert gas such as nitrogen. The high voltage wire 88 is electrically coupled to a hollow annular contact 90 at the end where the hose 84 is coupled to the fitting 86. The voltage on the wire 88 is introduced through the electrical contact 90 and an electrical contact 92 (FIG. 5) in the upper housing 73 and through conductors (not shown) to the anode of a thyratron 142 in FIGS. 10, 11 and 19.

A swivel joint 94 (FIG. 6) made from a suitable electrically conductive material is provided as a part of the hose 84 and a collar 96 (FIGS. 5 and 6) is extended from the swivel joint 94 in electrically coupled relationship with the swivel joint. An electrically conductive spring 98 is connected at one end to the collar 96 and at the other end to an electrically conductive sleeve 100. The sleeve 100 and the spring 98 are disposed on an insulating member 102.

The spring 98 is constrained so that the sleeve 100 normally engages the contact 90 and grounds the contact. When the contact 90 is extended into the housing, the sleeve 100 becomes withdrawn on the insulator member 102 from the contact 90 so that the ground on the contact 92 is removed. Voltage can then be applied to the contact 90 from a high voltage power supply 105

Figure 19:
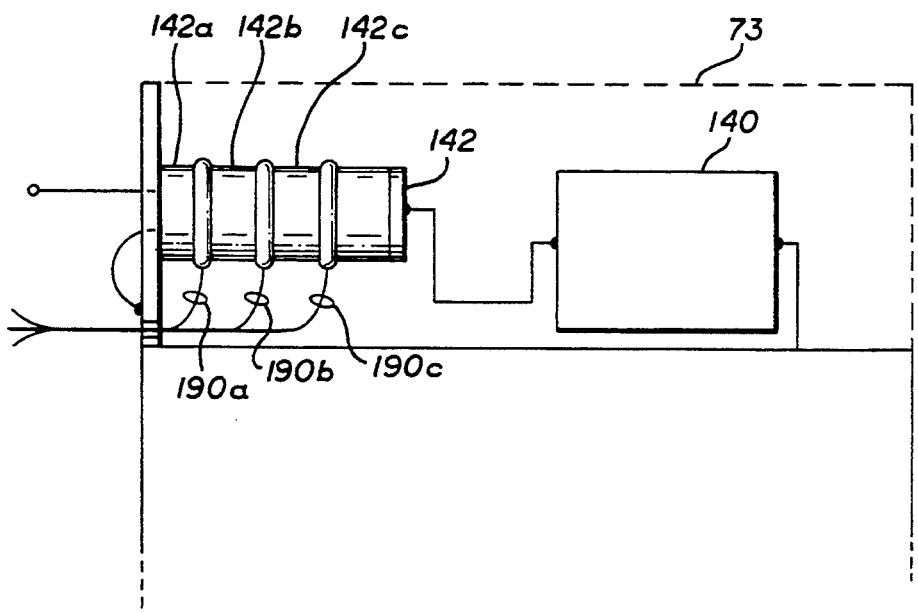
FIG. 19 is a schematic representation of tests performed on the different sections of a thyratron included in the high voltage components shown in FIGS. 10 and 11.
Figure 10:
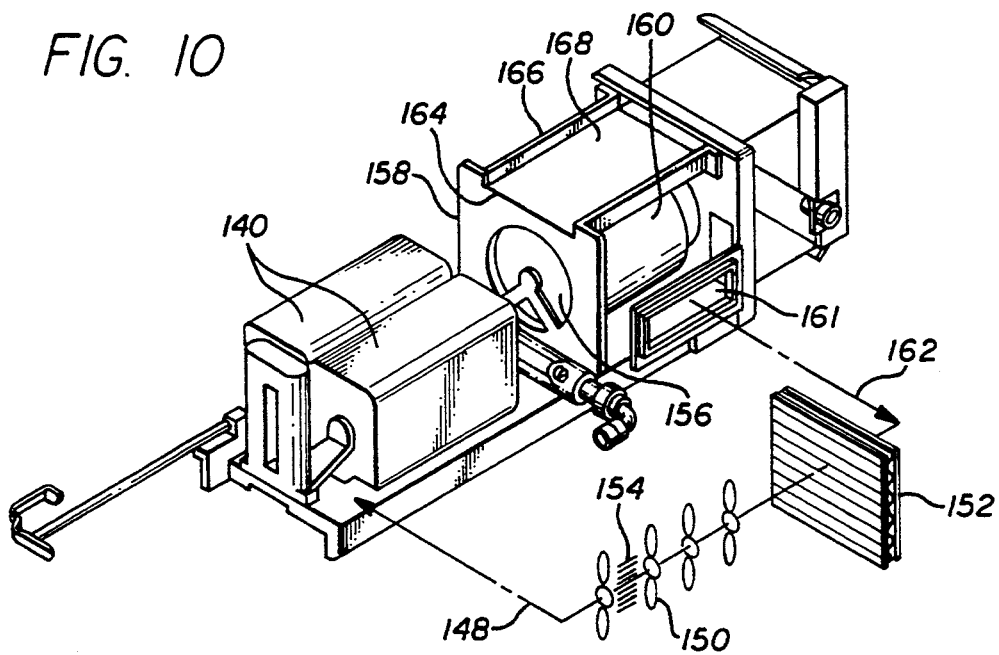
FIG. 10 is a perspective view of apparatus for cooling the high voltage components, including a thyratron, in the compartment above the housing.
Figure 11:
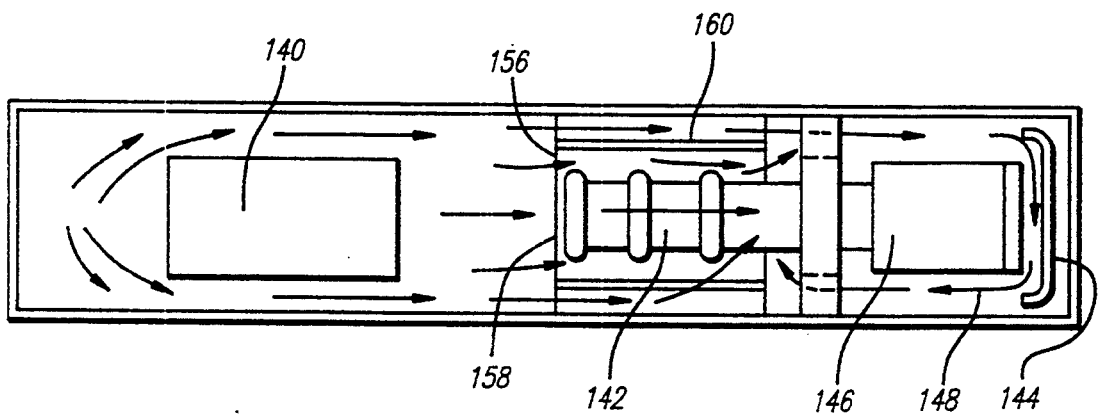
FIG. 11 is a schematic elevational view of the apparatus shown in FIG. 10 for cooling the high voltage components in the compartment.

(FIG. 3) to charge a capacitor 140 in FIGS. 10, 11 and 19.

FIG. 7 schematically shows an arrangement for precisely regulating the temperature of the gases 36 in the housing 11 (FIG. 1) at a particular value. The housing 11 is made from an electrically conductive material having non-corrosive and electrically conductive properties. The housing 11 is preferably provided with uniform properties as by providing the chamber with a configuration of a single material. This uniform construction of the housing 11 is desirable in precisely regulating the temperature of the gases 36 in the chamber.

A heater 112 is disposed on the housing 11 externally of the housing. A fluid such as water is disposed in a receptacle such as a pipe 114 in the housing 11. The water in the pipe 114 is recirculated and is cooled as by air during the recirculation. Such recirculation and air cooling are well known in the art and are disclosed in U.S. Pat. No. 4,959,840. A temperature probe or sensor 116 extends into the housing 11 to sense the temperature of the gases 36 in the housing. A microprocessor-based controller 118 receives the indications of temperature from the sensor 116.

Based upon the temperature indicated by the sensor 116, the microprocessor based controller 118 provides controls to the heater 112 and the cooling fluid 114 to regulate the temperature of the gases 36 in the housing 11 on a continuous basis. This temperature provides for an optimal operation of the laser 10. Since the heater 112 is disposed on the wall of the housing 11 and the housing 11 is a good heat conductor, the heat from the heater 112 is transferred directly into the housing. The rate of heat production by the heater 112 and the rate of flow of the cooling fluid through the pipe 114 are regulated to maintain the temperature of the gases in the housing 11 at a particular value on a continuous basis, whether the laser is operating or idle.

Figure 8:
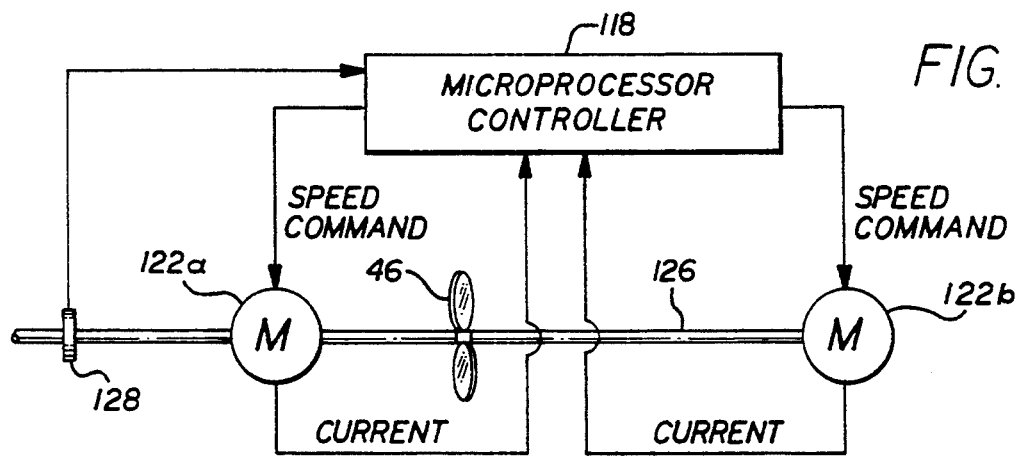
FIG. 8 is a schematic view of an arrangement of a fan and a pair of motors and a microprocessor controller for recirculating the gases in the housing and for operating the motors at a particular speed and in a balanced relationship.
Figure 9:
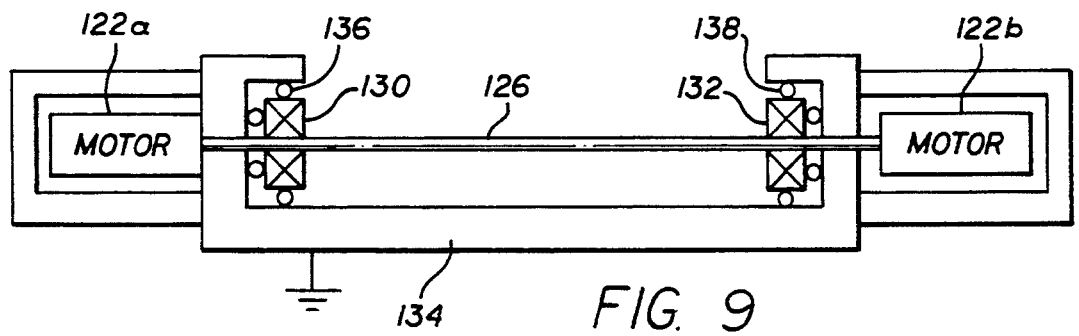
FIG. 9 is a schematic view of apparatus associated with one of the motors shown in FIG. 8 for electrically isolating the motor and damping any vibrations in the motor.

FIGS. 8 and 9 show an arrangement for driving the fan 50 (FIG. 1) for cooling the gases 36 in the chamber 11 (FIG. 1). To conserve space, two (2) motors 122a and 122b are provided on a common shaft 126 to drive the fan 46. The motors 122a and 122b have substantially identical characteristics. The operation of the motors 122a and 122b is controlled by the microprocessor-based controller 118 so that the motors drive the fan at a particular speed. This regulation may be provided by disposing a tachometer 128 on the shaft 126 and by introducing the output of the tachometer 128 to the microprocessor 118.

From the signal provided by the tachometer 128 measurement, the microprocessor 118 determines the rotational speed of the shaft 126. The microprocessor-based controller 118 then introduces signals to the motors 122a and 122b to regulate the speeds of the motors. In addition, the microprocessor-based controller 118 receives from the motors 122a and 122b indications of the currents in the motors, processes these indications and introduces signals to the motors to regulate the currents through the motors so that the currents are substantially equal. In this way, the motors 122a and 122b drive the fan 46 at the particular speed on a balanced basis.

The motors 122a and 122b and the shaft 126 are also shown in FIG. 9. In FIG. 9, the shaft 126 is rotatable on bearings 130 and 132. The bearings 130 and 132 are supported on a case 134 made from a suitable material such as stainless steel. The bearings are spaced from the case 132 as by mounts 136 and 138 made from a resilient material such as a fluorinated elastomer. In this way, any voltages generated as a result of the electrical discharge between the cathode 18 and the anode 20 are isolated electrically. Furthermore, any vibrations in the motors 122a and 122b are damped.

FIGS. 10 and 11 show an arrangement for cooling the components which produce the voltage pulses applied to the cathode 18. These components include a pair of capacitors 140, a thyratron 142 and a trigger board 144 on which electronic circuits are disposed. The components also include a power supply 146 for the thyratron 142. When the capacitors 140 become charged to a particular voltage by the high voltage power supply 105, the trigger board 146 triggers the thyratron, causing the capacitors to discharge through the thyratron. The circuits for controlling the triggering of the thyratron 142 are well known in the art and are disposed on the circuit board 144. The power supply 146 provides power to the thyratron 142.

In FIGS. 10 and 11, air is cooled and recirculated through a closed loop 148 for cooling the capacitors 140, the thyratron 142, the trigger board 144 and the power supply 146. The closed loop 148 includes fans 150 for driving the air in the closed loop and also includes a medium such as a source 152 of a cooling fluid such as water for cooling the air. An array of small tubes 154 such as those provided by Hexcel are disposed between the fans to direct the movement of the air in the path indicated by the arrows.

As shown in FIGS. 10 and 11, the recirculating air flows past the capacitors 140. A portion of the air then flows through an orifice 156 in a wall 158 into the space between the thyratron 142 and an insulating chimney 160 made from a suitable material such as a ceramic. The air cools the thyratron 142 as it flows in the space between the thyratron 142 and the chimney 160. The air is then exhausted through a port 161 into a pipe 162 included in the closed loop. Another portion of the air flows through an opening 164 into a passageway 166 defined by the lower end of the housing member 73 (FIG. 3) and a guide member 168 disposed on the chimney 160. This portion of the air flows past the power supply 146 and along the trigger board 144, which is provided with curved configurations at its upper and lower ends to guide the air for movement along the trigger board and then into the exhaust port 161. The heated air is then cooled by the heat exchanger 52 and recirculated by the fans 150 in the closed loop 148.

Figure 12:
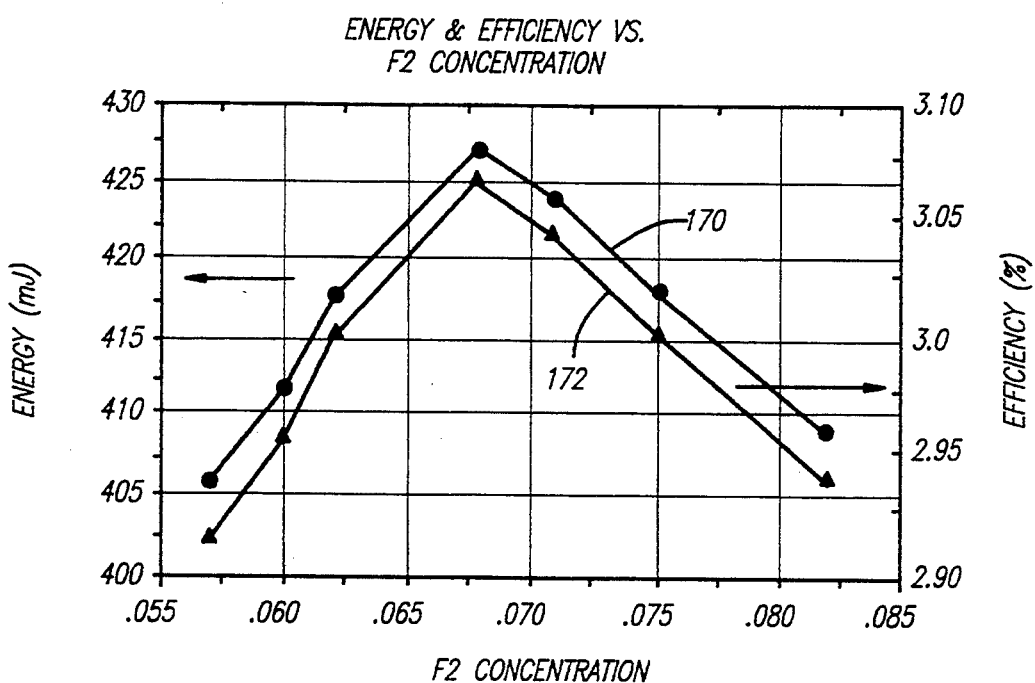
FIG. 12 shows curves of the energy and efficiency of each voltage pulse introduced to the cathode in relation to the concentration of one of the gases in the housing.

FIG. 12 shows a curve 170 in which the concentration of fluorine ($F_2$) is plotted on the horizontal axis and in which the energy in each output pulse is plotted on the vertical axis. FIG. 12 also shows another curve 172 in which the concentration of fluorine is plotted on the horizontal axis and in which the efficiency (in percent) of the laser 10 is plotted on the vertical axis. Here efficiency is defined as the ratio of laser energy and input electrical energy. As will be seen, the radiation energy in each output pulse in the laser 10 and the efficiency in the magnitude of the radiation energy in each output pulse in the laser relative to the magnitude of the input energy reach a peak at substantially the same concentration of fluorine in the housing 11. This peak is at a concentration of approximately 0.068% of fluorine ($F_2$). As will be appreciated, the laser 10 also contains krypton in a concentration in the order of one percent (1%). The remainder of the gas in the laser 10 constitutes a neutral gas such as neon.

Figure 13:
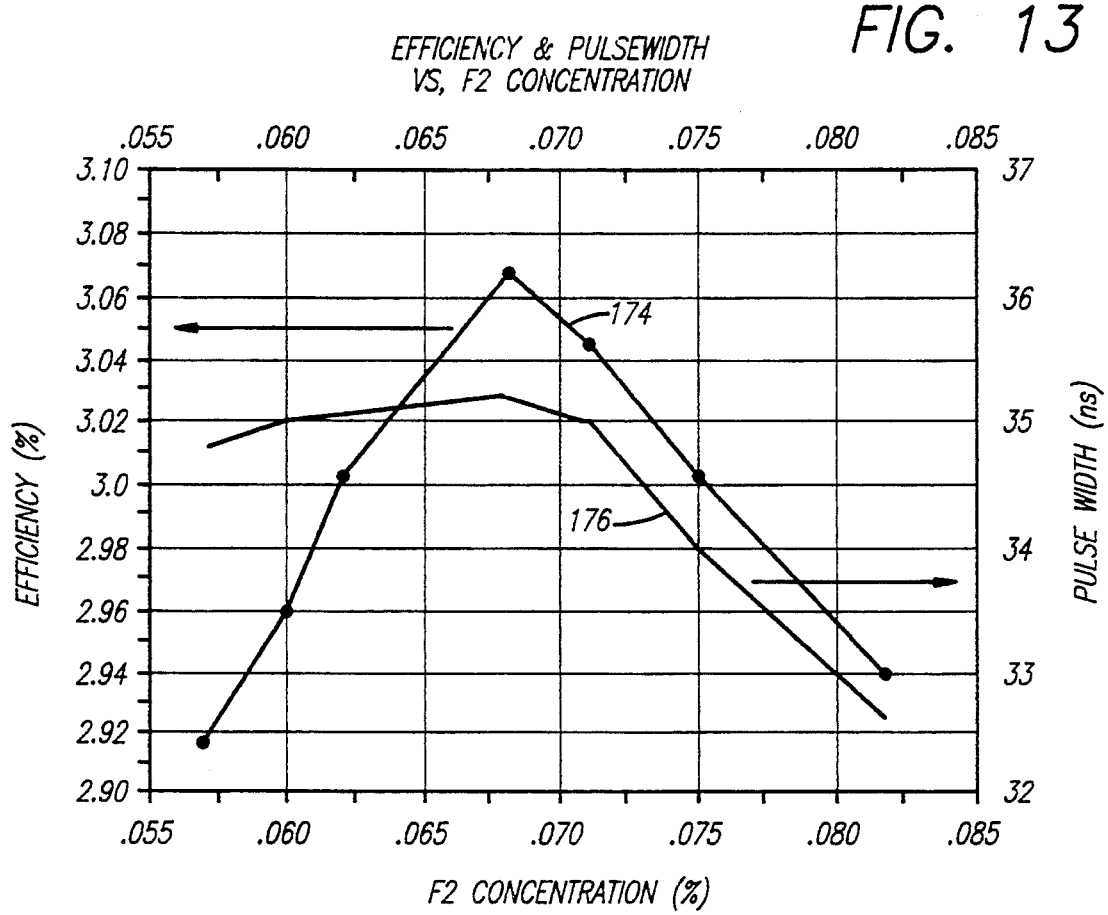
FIG. 13 shows curves of the efficiency and pulse width of the energy obtained from each voltage pulse introduced to the cathode in relation to the concentration of such one gas in the housing.

FIG. 13 also shows two (2) curves each with the concentration of fluorine ($F_2$) plotted on the horizontal axis. A curve 174 corresponds to the curve 172 in showing the relationship between the efficiency in the operation of the laser 10 and the fluorine ($F_2$) concentration. A curve 176 shows the relationship between the width (in nanoseconds) of the output pulses from the laser 10 for different concentrations of fluorine ($F_2$). As will be seen, the peak efficiency in the curve 174 and the peak in the pulse width in the curve 176 occur at substantially the same concentration of fluorine. This is substantially the same concentration as in the peaks of the curves shown in FIG. 12.

Figure 14:
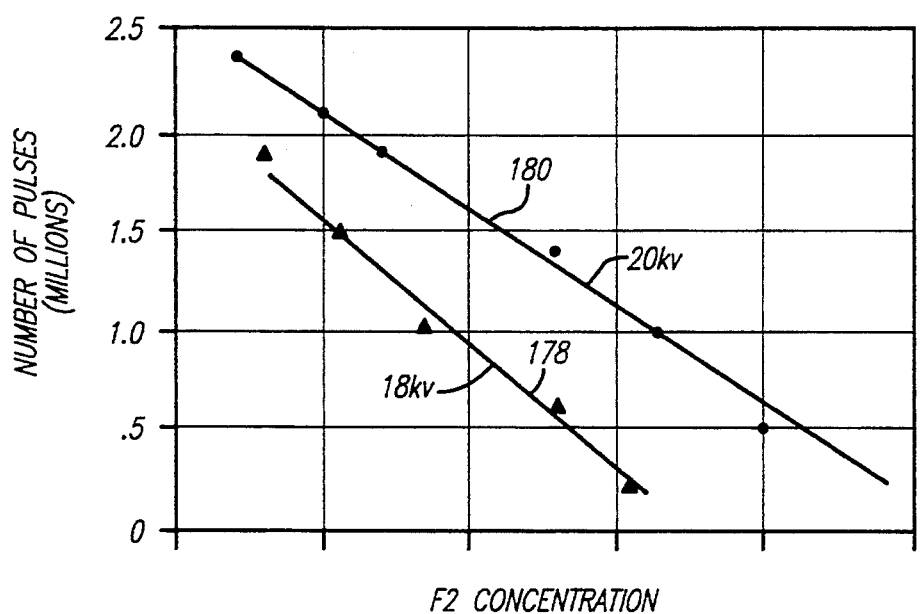
FIG. 14 shows curves of the number of voltage pulses for two (2) different magnitudes of voltage pulses introduced to the cathode in relation to the concentration of such one gas in the housing.

FIG. 14 illustrates the relationship between the number of pulses (shown in millions on the vertical axis) produced by the laser and the concentration of fluorine (the horizontal axis). FIG. 14 shows two curves 178 and 180 for two (2) different output energies, the curve 178 being for pulses of eighteen kilovolts (18 kV) between the cathode 18 and the anode 20 and the curve 180 being for pulses of twenty kilovolts (20 kV) between the cathode and the anode. As will be seen, without any addition of fluorine to the laser 10, the concentration of the fluorine progressively decreases in a linear relationship as the number of pulses from the laser increases.

The ultimate conclusion from FIGS. 12, 13 and 14 is that the concentration of fluorine in the housing 11 should be regulated at a value close to a concentration of approximately 0.068% in order to provide optimum energy from the laser 10 and optimum efficiency in the operation of the laser. This can be accomplished by initially increasing the concentration of the fluorine in the housing 11 in increments until the efficiency in the operation of the laser 10 and the maximum energy from the laser increase to peak values and then decrease slightly.

No further addition of fluorine to the chamber should then be made until the efficiency in the operation of the laser and the maximum energy from the laser increase to peak values and then decrease slightly. In this way, the concentration of the fluorine in the housing 11 may be alternately regulated between a value of approximately 0.070% and a value of approximately 0.066% to obtain peak energies from the laser 10 and peak efficiencies in the operation of the laser. Experience has shown that a laser operating at its maximum efficiency has an enhanced reliability and increased lifetime of the components in the laser.

A common technique to operate the laser 10 near its maximum efficiency is to fill the laser with just the right amount of halogen and then, as the number of pulses accumulate, replenish the halogen donor by injecting a small amount of the donor into the laser. For an industrial laser, the process of halogen injection should be automated. However, the process of halogen injection can be automated only if the halogen concentration is known. In excimer laser gas mixes, the halogen concentration is typically less than one tenth of one percent 0.1%. Therefore, the instrumentation to measure halogen concentration is too complex and expensive for an industrial laser.

This invention provides a halogen injection technique which operates the laser near its optimum efficiency. It relies on the fact that the halogen depletion rate as a function of input energy is known for a laser and that this depletion rate is linear as shown by the curves 178 and 180 in FIG. 14. Therefore, after a certain number of pulses, the halogen concentration can be estimated. An extremely small amount of halogen (a perturbation) is then injected into the laser gas. This perturbation to the laser gas medium could possibly result in an increase or decrease in laser efficiency. Depending upon whether this perturbation results in an increase or decrease in laser efficiency, additional increments in the halogen are introduced into the housing 11.

An increase in laser efficiency is an indication of a halogen-depleted laser gas, and further halogen injections are continued until there is no increase in laser efficiency. A halogen injection resulting in a decrease in laser efficiency is indicative of a gas mixture which is either too rich or just optimum in halogen. Since the halogen injection is only a perturbation of the gas mixture, the resulting change in laser efficiency is very small but just enough to terminate further injections.

In the following paragraphs, a microprocessor-based implementation of the aforementioned $F_2$ injection technique is described for a KrF laser. The implementation for other excimer gases is similar. The algorithm described in the following paragraphs is also self-learning in the sense that it corrects for situations when a halogen is injected either too soon or too late.

Figure 15:
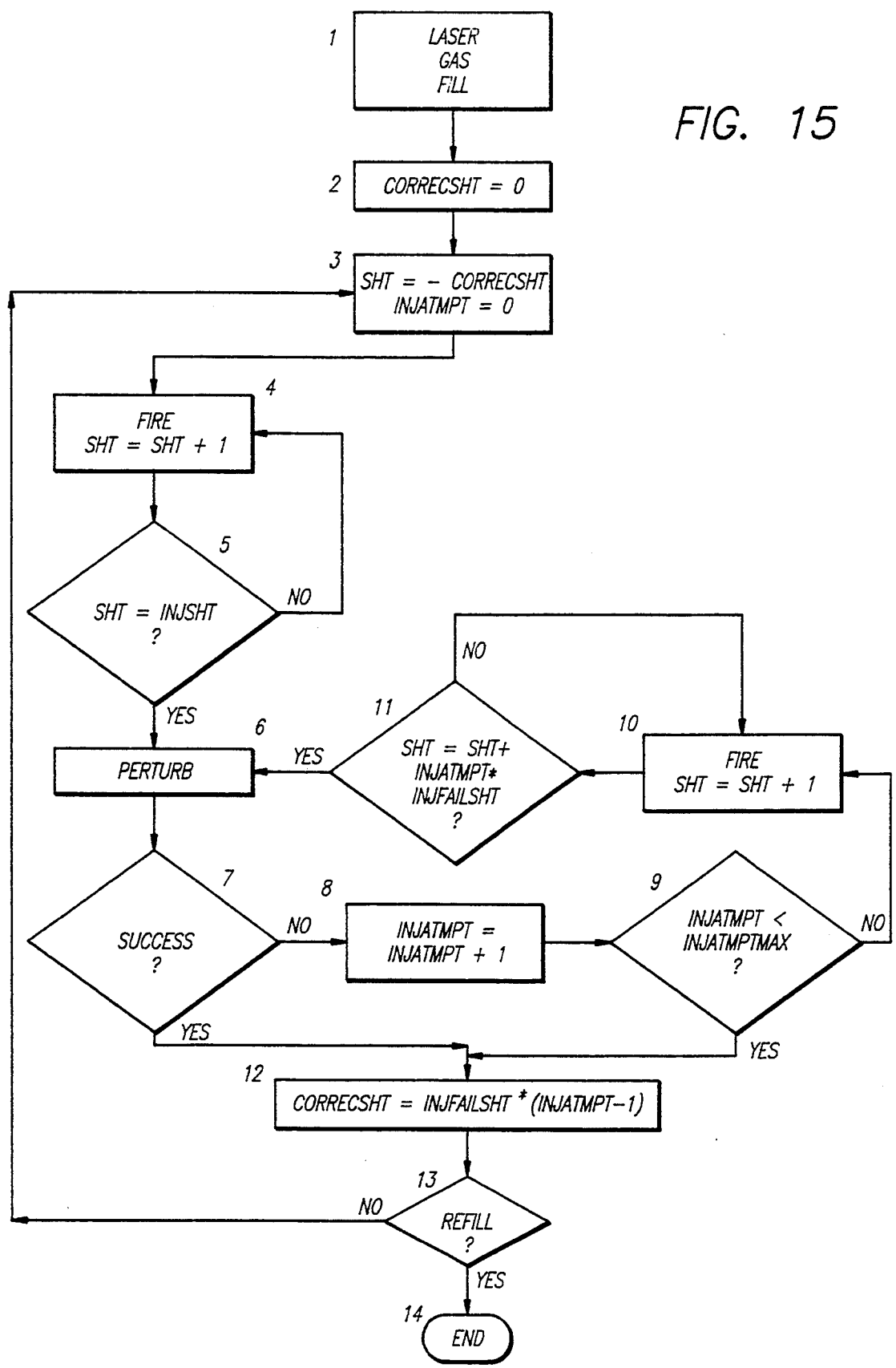
FIG. 15 is a flow chart schematically illustrating how the concentration of such one gas in the housing is regulated near an optimal value.
Figure 16:
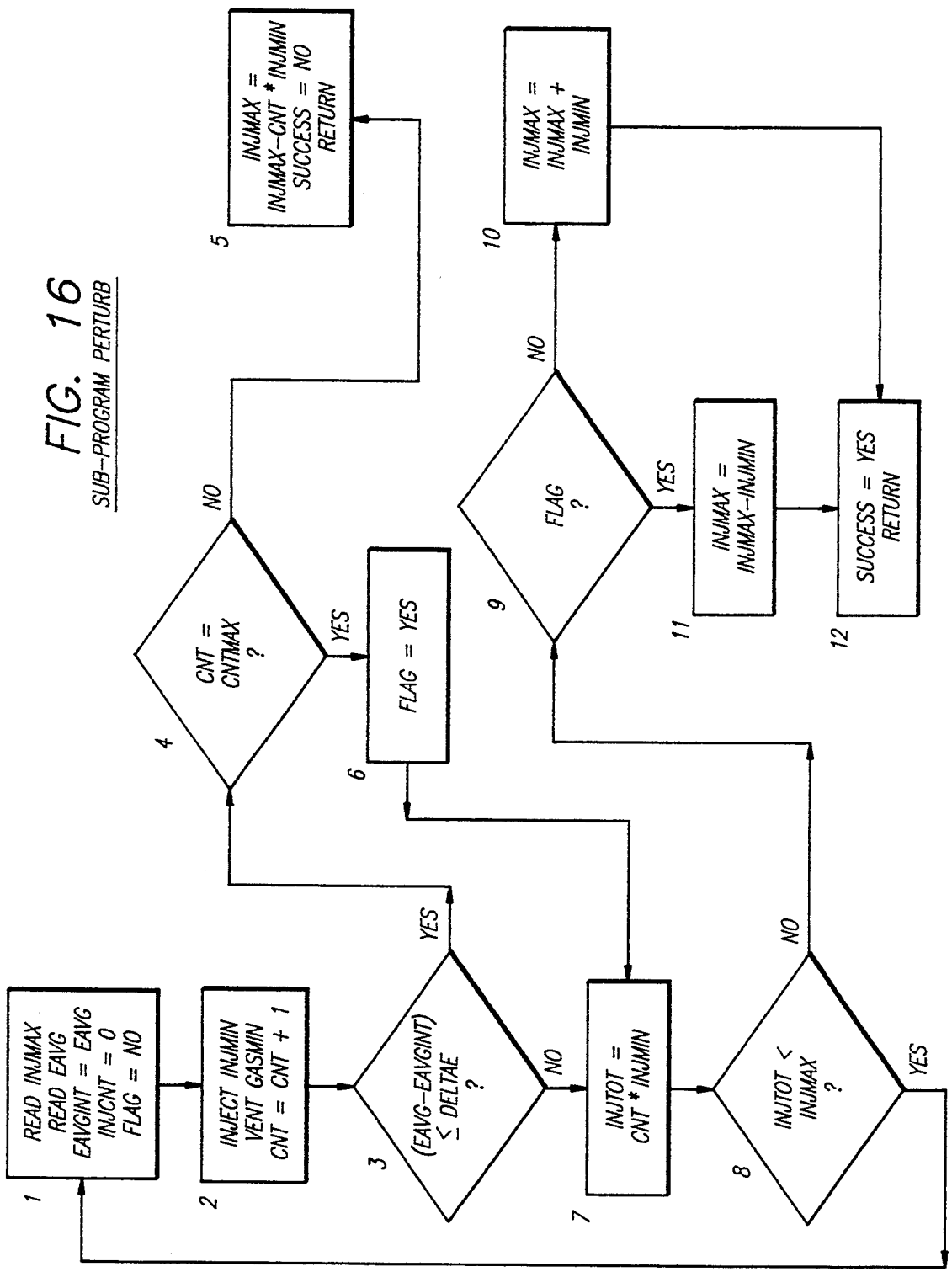
FIG. 16 is an expanded flow chart of one of the steps shown in the flow chart of FIG. 15 and schematically illustrates additional details of the operation of regulating the concentration of such one gas near the optimal value.

In the embodiment of the invention shown in FIGS. 15 and 16, the microprocessor controller 118 commences its $F_2$ injection program when the laser chamber is filled with fresh laser gas. In this example, the laser gases are krypton, fluorine and the buffer gas neon. The microprocessor controller 118 retains in its non-volatile memory a look-up table pertaining to F2 consumption as a function of input voltage and the number of laser pulses. The data in the look-up table is based on detailed parametric studies performed on similar lasers.

Figure 14A:
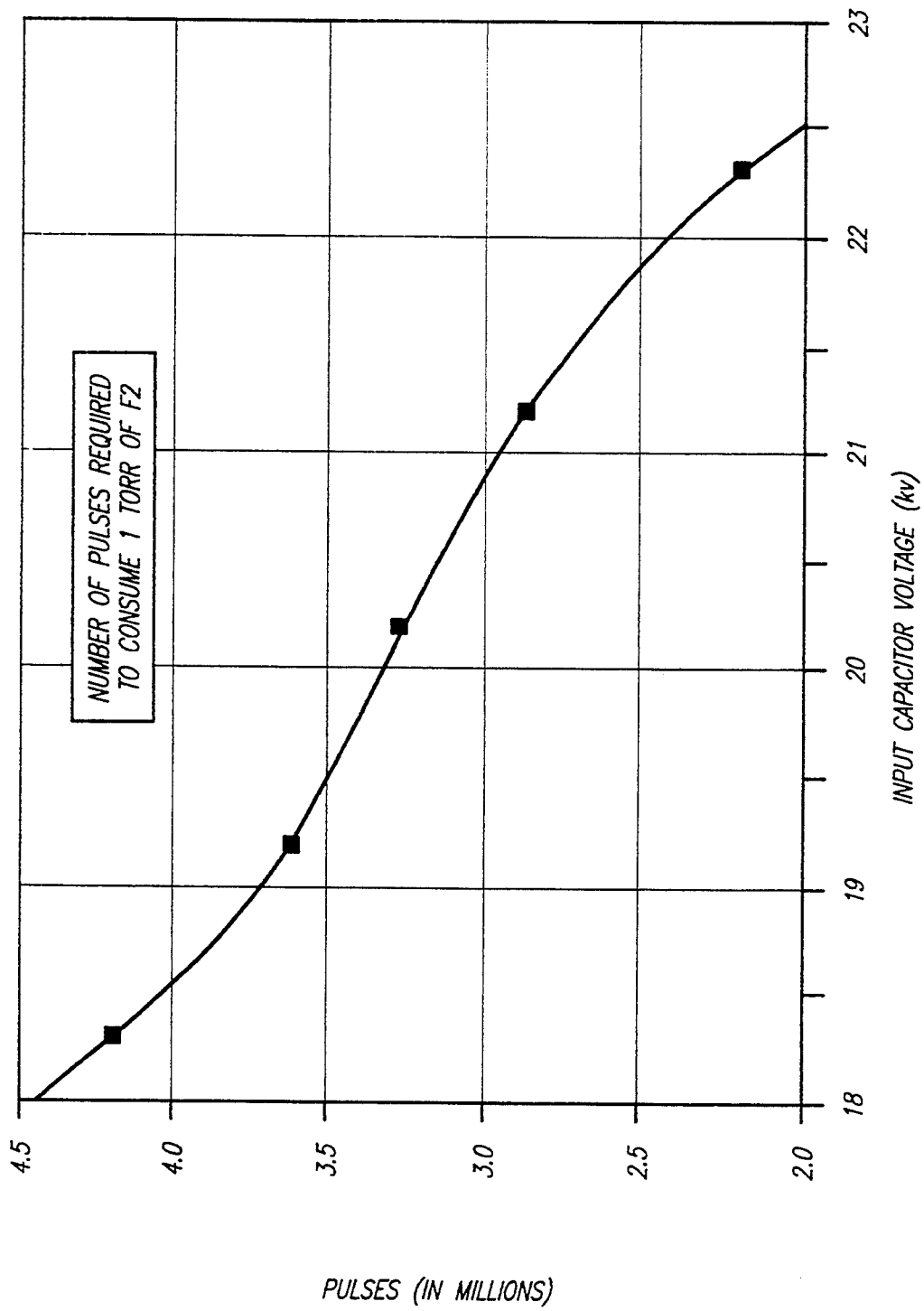
FIG. 14A is a curve showing the relationship between the number of pulses for producing one (1) Tort of a particular gas such as fluorine ($F_2$) and the voltage on an input capacitor connected in a circuit with the thyratron.

Experience has shown that lasers which are similar in construction and output performance have approximately the same F2 consumption characteristics. A sample table is shown in a graphical form in FIG. 14A. FIG. 14A is a curve showing the relationship between the number of pulses for producing one (1) Torr of a particular gas such as fluorine ($F_2$) and different values of the voltage introduced to the capacitors 140 in FIGS. 10, 11 and 19. From FIG. 14A, one can estimate the number of pulses required to consume 1 Torr of $F_2$ at a predetermined voltage of the capacitors 140. Or, if the average voltage for a given number of pulses is known, the amount of consumed F2 can be estimated as indicated in FIG. 14A.

In practice, as the laser 10 operates, the input voltage varies depending upon the output energy requirements and upon a host of other parameters which affect laser output. The microprocessor-based controller 118 computes a running average of the operating voltage and periodically refers to the look-up table such as shown in FIG. 14A to compute an estimate of the decrease in $F_2$. After a predetermined decrease in $F_2$, an injection is initiated. The permissible decrease in $F_2$ concentration capable of initiating an $F_2$ injection is determined from the energy vs. $F_2$ concentration curve, similar to the one indicated at 170 in FIG. 12.

The specifics of the $F_2$ injection method are shown in the flow charts shown in FIGS. 15 and 16. The following paragraphs are numbered to correspond to numbered steps in FIG. 15. For example, the paragraph numbered "5" below refers to the step numbered as "5" in FIG. 15. The numbers in FIG. 15 are to the left of the designated steps in the flow chart.

1. The LASER GAS FILL initiates the $F_2$ injection method. In this step, the housing 11 is filled with the gases providing the chemical reaction. These gases may comprise krypton, fluorine and an inert gas such as neon. The fluorine concentration is approximately equal to the optimal value.

2. Immediately after the gas fill, a variable, CORRECSHT, is initialized to zero. This variable, an integer, is a correction to the initial estimate of the number of pulses after a gas fill when the $F_2$ injection is initiated. As will be seen subsequently, this variable can be either positive or negative and accounts for deviations in the $F_2$ consumption of a laser from the look-up table (FIG. 14A).

3. Two other variables, both integers, are initialized. These are SHT and INJATMPT. SHT is a count of the number of pulses a laser fires after a gas refill or after a $F_2$ inject. It is initialized to -CORRECSHT. After a gas fill, SHT is set to 0. As will be seen subsequently, the counter is initialized every time a gas fill or a $F_2$ inject occurs. INJATMPT is the number of attempted injections, starting with the initial value of 0. The counter INJATMPT will be clarified subsequently.

4. The counter SHT increments every time the laser fires. As the laser fires, the microprocessor controller 118 computes a running average of the voltage provided that SHT is greater than zero (0). The microprocessor-based controller 118 then utilizes the look-up table (FIG. 14A) and computes the decrease in $F_2$ concentration based on the value of SHT.

5. At a particular value of SHT designated by INJSHT, the $F_2$ concentration is determined by the microprocessor-based controller 118 to have decreased by a predetermined amount so that a noticeable decrease in laser efficiency has occurred.

6. An $F_2$ injection is initiated as by a procedure known as PERTURB. The procedure PERTURB is shown in the form of a flow chart in FIG. 16. It is described subsequently.

7. PERTURB returns a value for a Boolean variable SUCCESS. An $F_2$ injection is considered a failure if it results in a measurable decrease in laser energy or efficiency. In other words, success is set to NO.

8. If SUCCESS is NO, the counter INJATMPT is incremented by 1. This means another unsuccessful injection attempt was made.

9. The program permits only a certain maximum of injection attempts designated by INJATMPTMAX. An excess of attempted injections can lead to a laser gas mix that is too rich in $F_2$.

10. If the number of attempted injections is less than the permitted maximum, the counter SHT is incremented by an integer every time that the laser fires.

11. An $F_2$ injection is retried via the sub-program PERTURB when the SHT counter increments by a small number of pulses. This small number is designated by the integer constant INJFAILSHT. It is usually selected to be a fraction of typical INJSHT values.

12. If the number of attempted injections is equal to the permitted maximum, the process of injection is terminated and a new value for CORRECSHT is calculated. The next injection will be offset by an amount equal to CORRECSHT. Its value can be positive or negative. If, in Step 7, SUCCESS returns yes, the integer INJATMPT will be zero. In this case, the value of CORRECSHT is negative—that is CORRECSHE=INJFAILSHT. When the first injection attempt results in an increase in laser efficiency (or power), this suggests that the laser has probably been operating with less than optimal $F_2$. Therefore, during the next cycle, the SHT counter is equal to CORRECSHT instead of zero (0) so that the next injection occurs INJFAILSHT pulses earlier. If INJATMPT is greater than one (1), the next injection is delayed by an amount equal TO CORRECSHT.

13. A gas refill (i.e. the laser is evacuated and replaced with fresh gas) terminates the cycle. Otherwise the cycle continues.

SUB-PROGRAM PERTURB

The details of the procedure PERTURB are shown in the flowchart designated as FIG. 16. This procedure is important in the Injection technique. The following paragraphs are numbered to correspond to the numbered paragraphs in FIG. 16. The numbers in FIG. 16 are to the left of the designated steps in the flow chart.

1. Upon entry into the PERTURB procedure, the microprocessor-based controller 118 reads a value for the maximum amount of $F_2$, INJMAX, which can be injected in this perturbation. This value is provided by the user and, after each gas refill, INJMAX initializes to this value. However, as the laser pulses and $F_2$ injections occur between gas fills, the value of INJMAX is adjusted as described below. The microprocessor-based controller 118 also reads the value of EAVG. This is either the average value of laser energy if the laser is working at a constant input voltage, or it is the laser voltage if the laser is operating at a constant output energy. A variable EAVGINT is set to this value of EAVG. A counter CNT is initialized to 0. FLAG is a Boolean variable and is set to NO. Its role will be described subsequently.

2. A small amount of $F_2$ INJTMIN is then injected into the laser. In practice, after the injection, an identical amount of the gas mix is vented from the laser in order to maintain a constant laser pressure. The counter CNT is incremented as the laser fires. The microprocessor-based controller 118 reads a new value for EAVG. The value of INJMIN is determined by the user and usually depends upon the resolution of the pressure measuring device.

3. The difference in EAVG and EAVGINT is then compared with DELTAE, a user supplied number. In principle, DELTAE could be 0. However, in practice, because of the inherent pulse-to-pulse variation in the laser energy or voltage, DELTAE is set to a non-zero value. If the laser is operating at constant energy, DELTAE corresponds to the regulation of the voltage. In the constant energy mode, DELTAE is the statistical standard deviation of the laser energy.

4. If it is determined that the difference is less than or equal to DELTAE, then the counter CNT is compared with a predetermined maximum CNTMAX. This maximum is necessary to ensure that CNT does not assume large values (i.e. too many INJMIN), implying that the laser gas becomes enriched with $F_2$.

5. If CNT has not exceeded CNTMAX, a new value for INJMAX is calculated. INJMAX is smaller than its previous value by an amount equal to the amount just injected in this unsuccessful attempt. The Boolean variable SUCCESS is set to NO and is returned to the main program. When the sub-program is revisited, INJMAX has a different value.

6. If CNT has exceeded CNTMAX, the Boolean variable FLAG is set to YES. The sub-program proceeds to the next step, implying that the process of injection is continued. In other words, the fact that EAVG is less than EAVGINT is ignored. Such a step is taken to guard against a possibly small decrease in laser energy when the F2 concentration in the laser is near optimum. As will be seen subsequently, the state of the FLAG is also used to vary INJMAX.

7. The total amount of $F_2$, INJTOT, is calculated.

8. The amount of $F_2$, INJTOT, is then compared with the maximum INJMAX read by the microprocessor controller 118 in step 1. If the total $F_2$ injected so far is less than the maximum, the sub-program recycles.

9. If not, the state of the FLAG variable is checked.

10. If the check indicated in Step 9 is YES, then possibly the amount of $F_2$ slightly higher than optimal was injected and the maximum value of INJMAX is reduced by INJMIN.

11. If the check indicated in Step 9 is NO, each injection has resulted in an increase of EAVG over EAVGINT. Possibly, the laser is lean in $F_2$. Therefore, INJMAX is incremented by INJMIN.

Thus a new $F_2$ injection technique is described which strives to maintain the $F_2$ concentration in the laser 10 near its optimal value. The technique first estimates the decrease in the concentration based upon input voltage. The process of injection involves perturbing the laser gas with a small amount of $F_2$ and then looking for a change in the laser output. An increase in output continues the process of injection, but a decrease terminates the process. Since the amount of injected $F_2$ is small, the laser $F_2$ concentration does not deviate far from its original value. The technique is self-learning. Therefore, as the laser operates, all of the critical parameters of the $F_2$ injection technique are automatically adjusted to maintain nearly optimal $F_2$ concentration.

Pulsed laser applications, such as materials processing, require a known amount of laser energy incident upon the material being processed. In fact, in most of these applications, process control is achieved by controlling the energy incident upon the surface of the material. Therefore, an industrial laser is equipped with an energy detector which measures the energy of each laser pulse. The laser-based micro-controller communicates the energy to the user's controller. Upon command from the user, the laser-based microcontroller can adjust its operating conditions to maintain constant laser energy or change the laser energy to a new value.

Occasionally, a malfunctioning component or subsystem in the laser can result in less-than-expected energy. Such low energy events can be random or frequent and can result in loss of process control. Typically, if the laser energy deviates from a user specified range, the laser controller can be programmed to terminate laser operation. Trained service personnel are then required to isolate the malfunctioning component or sub-system. Experience has shown that trouble-shooting for the cause of lower than expected energy can be laborious and long. This is especially the case when the problem occurs only when the laser is operating, i.e. under dynamic conditions. Dynamic problems require the use of specialized diagnostic tools operated by well-trained service personnel.

An example of a dynamic problem is a thyratron which switches energy from the capacitor to the laser before it is triggered (i.e. the thyratron prefires). The equipment to detect a thyratron prefire is a pulsed high-voltage probe and a digital storage oscilloscope. On the other hand, a static problem manifests itself even when the laser is not operating such as from a dirty laser window. Simple visual inspection can usually detect dirt on a laser window. Therefore, these problems are relatively easy to isolate and solve.

Industrial equipment with built-in dynamic diagnostics to monitor system performance are now being routinely used. These diagnostics reduce equipment down time by helping the user isolate the cause of the problem. Additionally, they provide valuable data to the equipment manufacturer about component or sub-system performance and lifetime. This embodiment of a laser system incorporates a novel implementation of microprocessor controlled diagnostics built into an industrial laser such as an excimer laser. These diagnostics are placed in various critical locations in the laser. The microcontroller continuously monitors these diagnostics. When it detects a low energy pulse, it examines and analyzes its stored data from these diagnostics and informs the user about the likely cause of the problem. In their absence, the user might have to resort to a series of trouble-shooting steps to first duplicate the problem and then isolate the faulty component.

Figure 17:
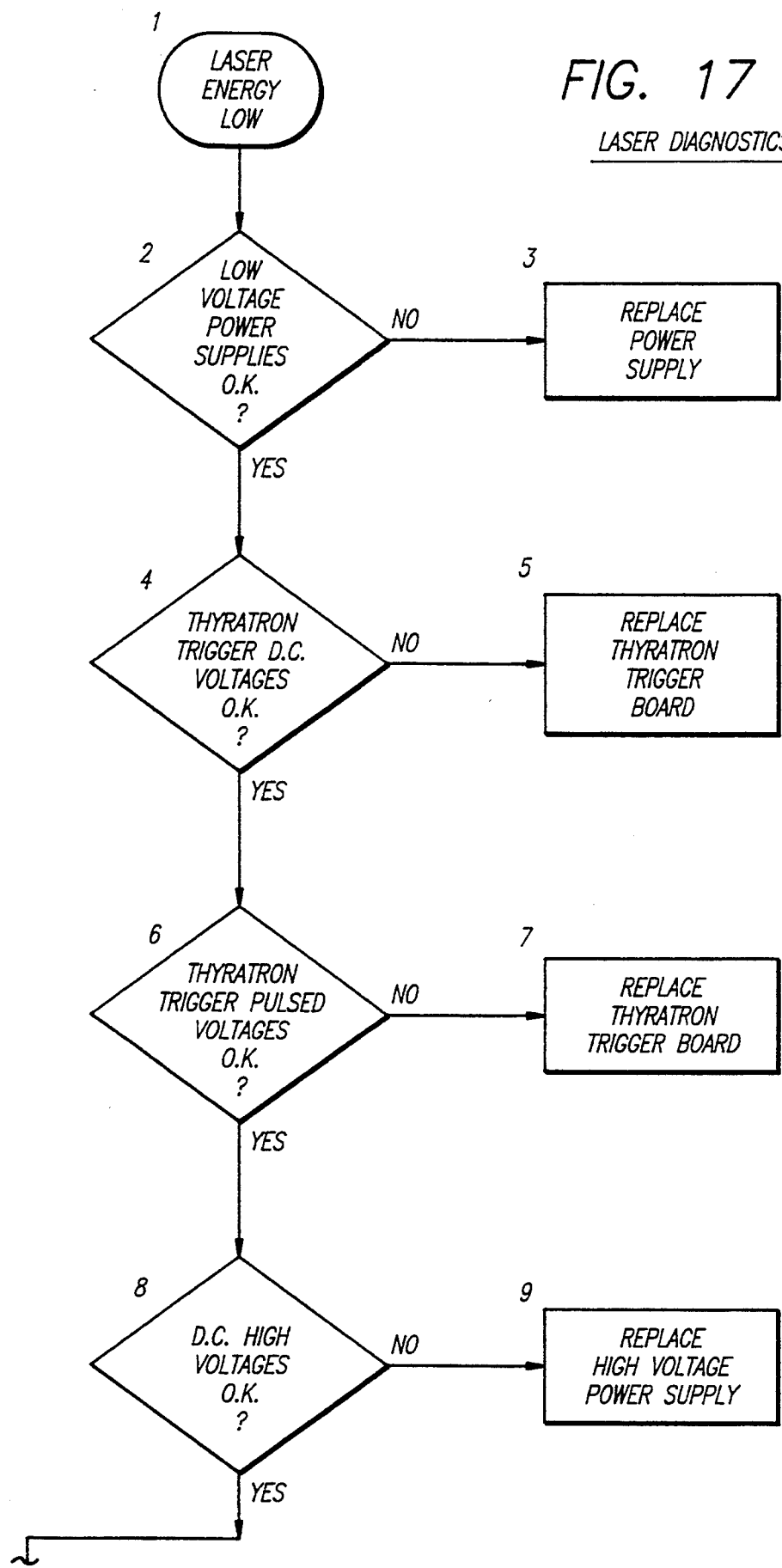
FIGS. 17A and 17B are flow charts cumulatively showing the sequence of tests performed on the different high voltage components when the required high voltage pulses are not being introduced to the cathode.
Figure 17:
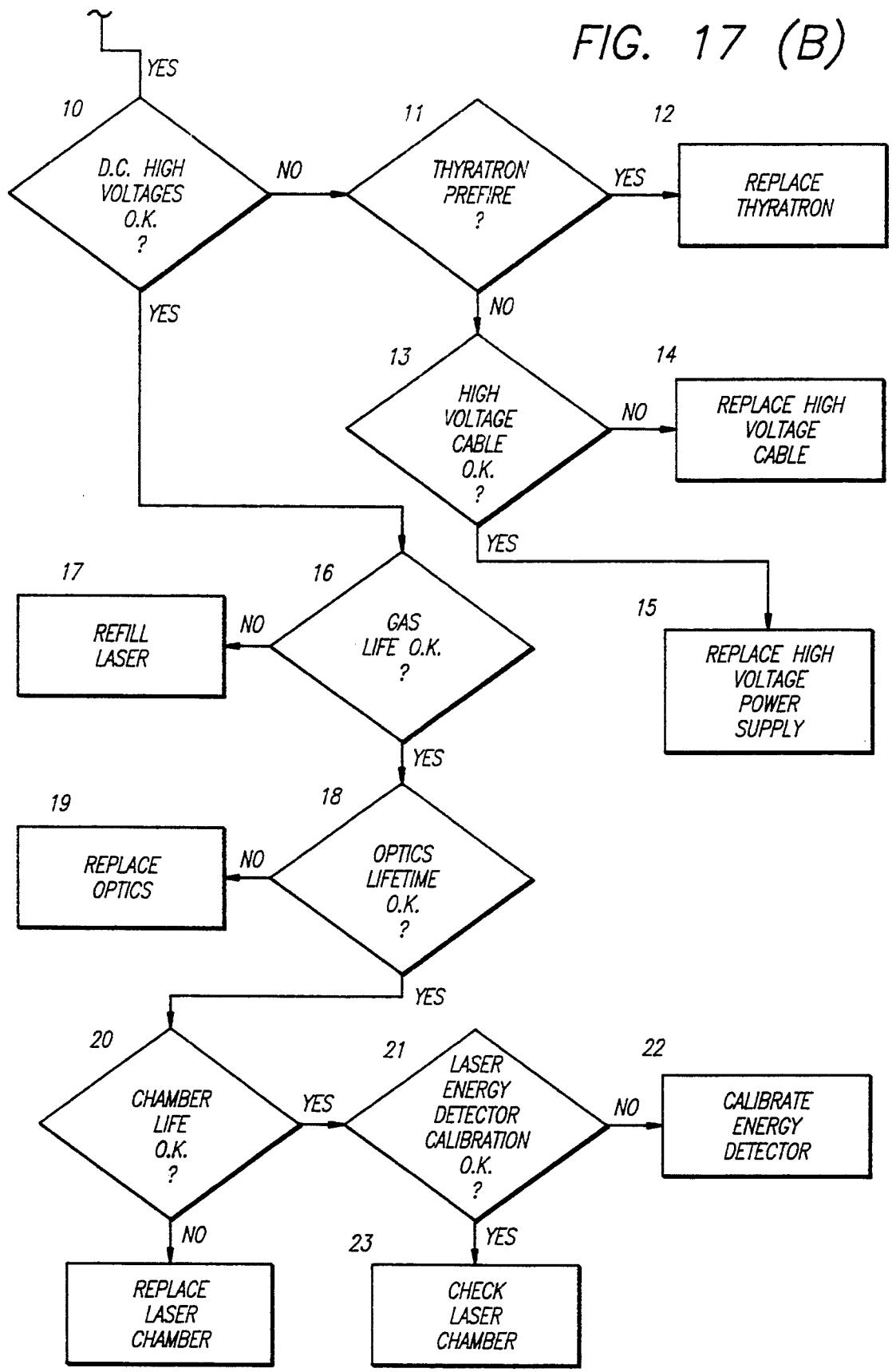

The process of automated diagnostics can be clearly described with the help of the cumulative flow-chart in FIGS. 17A and 17B. Each step in the analysis is numbered in FIGS. 17A and 17B, and the numbered paragraphs below refer to such numbers in FIGS. 17A and 17B. The details of the diagnostic hardware are not described. Most are voltage or current sensors whose analog outputs are converted by analog-to-digital converters and then monitored by the laser-microcontroller. Wherever required, the signals are appropriately filtered for noise (radio frequency) reduction.

(1) The laser microprocessor-based controller 118 determines that the laser energy is below the user's specified value by an amount greater than the user specified tolerance. The laser is shut down and requests service from the user. In the following steps, the microprocessor-based controller 118 analyzes its stored data and indicates to the user the probable cause.

(2) The microprocessor-based controller 118 checks whether the magnitudes of low voltage power supplies in the laser (5, 12, 24, 48, 6.3 VDC, etc.) are within specified tolerances. Since some of these voltages are used as references, significant deviation in their magnitudes can cause calibration errors.

(3) Replace the appropriate faulty power supply.

(4) The micro-based controller 118 now checks the DC voltages on the thyratron trigger board 144 (see FIGS. 10 and 11). Proper voltage sensors at key locations on the board indicate whether the power supply or the critical solid-state switching elements are operating normally. The DC voltages not only generate the pulses to trigger the thyratron 142, but also various bias voltages required for proper operation of the thyratron.

(5) Replaces the thyratron trigger board 144 since one or more voltages are outside predetermined range.

(6) Even if DC voltages on the trigger board 144 are normal, its switching elements may be malfunctioning. The switching elements generate three pulses in a particular sequence to the thyratron 144 (FIG. 19). Three current sensors 190a, 190b and 190c sense these pulses. (In practice, the outputs of the current sensors are filtered, integrated and compared to references).

(7) Replace the thyratron trigger board 144 if one or more of the trigger pulses are outside the specified tolerances.

(8) The high voltage power supply (HVPS) 105 in FIG. 3 has built in diagnostics, typical of any commercial supply. These diagnostics detect fault conditions inside the supply and shut it down and report the faults to the microcontroller.

(9) Replace the supply 105 if a fault is detected.

Figure 18A:
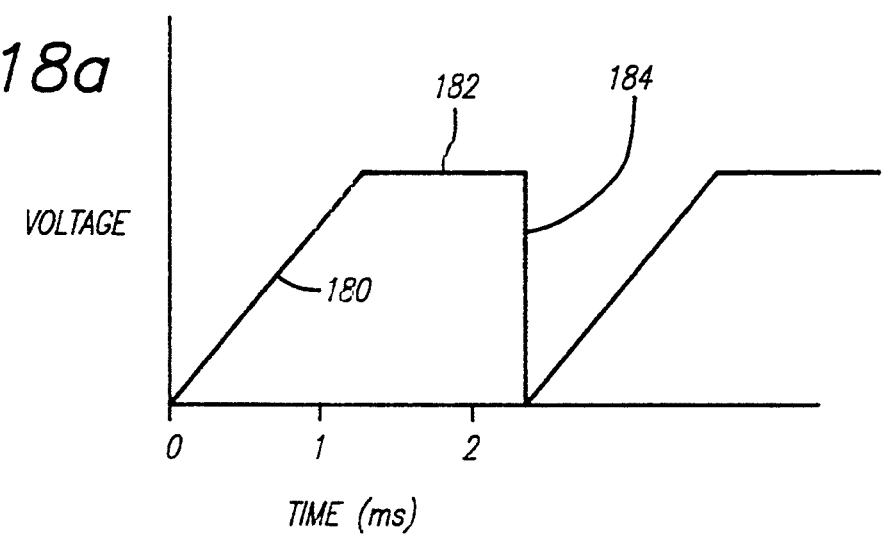
FIG. 18a and 18b are respectively schematic representations of the voltages produced on the anode of the thyratron and the corresponding currents through the anode of the thyratron when the power supply is operating properly to produce the high voltages.
Figure 18B:
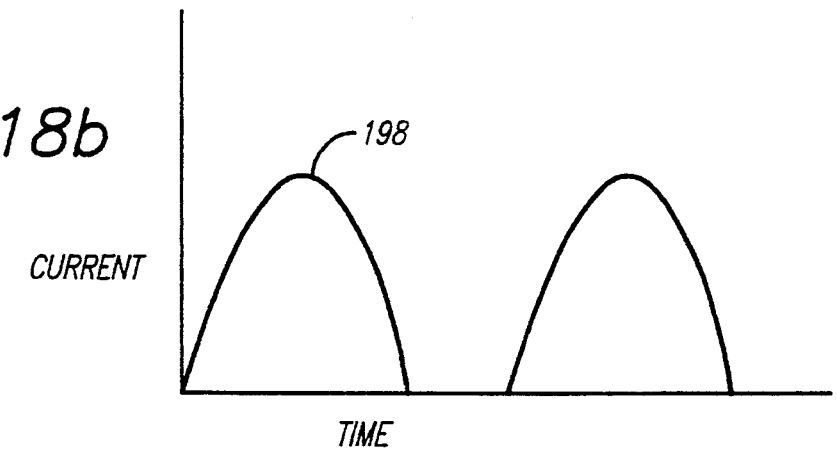

(10) Occasionally, the HVPS may not detect or report a fault even if it has no output. For instance, if there is no power to the HVPS (due to a blown fuse), the supply would neither have any output nor report a problem. The HVPS uses a voltage sensor coupled with a feed-back circuit to regulate its output voltage. The voltage sensor monitors the output of the HVPS. A malfunction here can result in an erroneous output voltage. A corresponding current sensor also exists in the HVPS. Both of these sensors are monitored by the laser controller 118. The voltage sensor signal is used by the laser controller 118 to determine whether the HVPS output is equal to its command voltage. Under normal conditions, the HVPS charges the capacitors 140 in FIG. 19 to the command voltage. The voltage sensor signal as monitored by the controller 118 is seen in FIG. 18a. Once the command voltage has been attained (182), the HVPS ceases to charge the capacitor. In FIG. 18b, the current wave form 198 is shown. As soon as the capacitors 140 are charged to the command voltage, the charging current ceases.

Figure 18C:
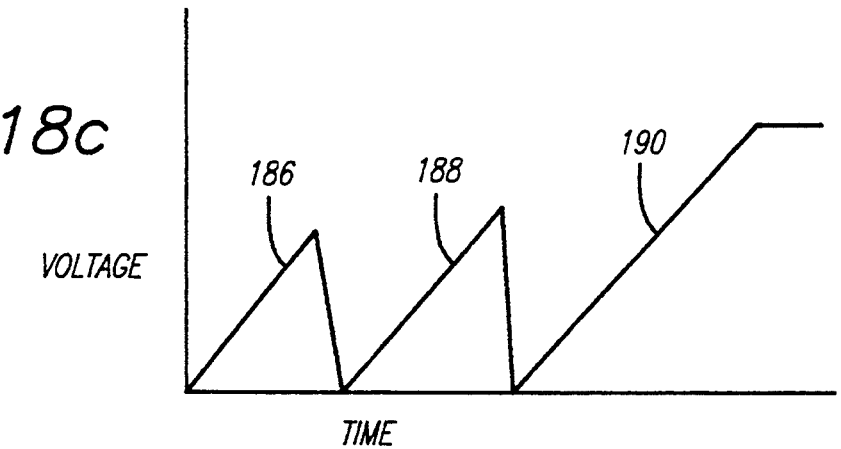
FIG. 18c is a schematic representation of the voltages produced on the anode of the thyratron when the thyratron is prefiring.

(11) Before any conclusion can be reached about the well-being of the HVPS, the controller 118 checks for any thyratron 142 prefire. Thyratron prefires can be explained by comparing FIGS. 18a and 18c. In FIG. 18a, after the capacitor attains the command voltage 182, the thyratron 142 switches the capacitor energy into the laser as indicated at 184. Thyratron switching is performed by the thyratron trigger board and is initiated by the laser microprocessor controller 118. However, under some circumstances, the thyratron 142 can self-switch, before the command of the microprocessor controller 118, i.e. it prefires. The self switching can be seen at 186 in FIG. 18c. Before the capacitors 140 have charged to the command voltage, the thyratron 142 prefires. The voltage of the capacitors 140 drops to zero. Subsequently, the HVPS continues charging the capacitors 140 as indicated at 188 in FIG. 18c, but the capacitors 140 do not reach the command voltage before the microprocessor-based controller 118 initiates the thyratron trigger. In practice, the microprocessor-based controller 118 looks for any drop in voltage once it has initiated a charge command and before it initiates the thyratron trigger command. Any drop in voltage is considered to be a prefire of the thyratron 142.

(12) A prefire of the thyratron 142 is detected and reported. If prefire rate is greater than a predetermined rate (e.g. 1 in a million), a thyratron change is requested.

(13) If the microprocessor-based controller 118 detects a HVPS current as indicated at 198 in FIG. 18b, but no voltage 180 and 182 as indicated in FIG. 18a, it concludes that possibly the high voltage cable 88 in FIG. 6 is defective or shorted.

(14) The controller requests service on the HV cable assembly.

(15) The controller does not detect any voltage or current from the HVPS, possibly due to an internal fault in the HVPS. The supply is probably completely inoperative. It requests HVPS service.

(16) After every gas refill, the microprocessor-based controller 118 initializes a counter to zero. As the laser fires, the counter is incremented. The controller compares the value of this counter to a predetermined maximum.

(17) If the counter exceeds the predetermined maximum, the microprocessor-based controller 118 requests a gas refill. This has been described above in detail and is shown in FIGS. 15 and 16.

(18) Counters associated with the laser resonators and optical elements 46 are initialized when they are replaced or serviced. As the laser fires, these counters are incremented. The controller compares their values to a predetermined maximum.

(19) If any one of the counters exceeds its limits, service is requested.

(20) The laser chamber counter is checked against its predetermined maximum.

(21) If the laser chamber counter does not exceed the maximum, the user is asked to check the calibration of the laser energy detector against an absolute energy/power meter.

(22) If the laser detector is miscalibrated, the user is asked to calibrate the detector against the power meter.

(23) If the calibration is satisfactory, the user is asked to examine the laser chamber for any obvious defects. The user's attention is then drawn to a trouble-shooting manual which elaborates possible chamber problem.

(24) If the chamber shot counter exceeds the maximum, the user is requested to replace the laser chamber.

An automated laser diagnostic system for an industrial excimer laser has been described and is shown in FIGS. 17A and 17B. The signals from several dynamic and static diagnostic sensors are stored and examined when the laser's performance is below par. The stored data is compared to predetermined values, and any deviation is reported to the user as a probable cause—all of this in a fraction of a second. On the other hand, the absence of automated diagnostics would require special tools, skilled workers and valuable manufacturing time to achieve the same results.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination,
a housing having a homogeneous construction,
a laser having an anode and a cathode disposed in spaced relationship in the housing,
heater means supported by the housing for heating the area within the housing,
means for producing an electrical discharge between the anode and the cathode,
there being gases within the housing for ionization and chemical reaction upon each electrical discharge between the anode and the cathode,
a heat exchanger disposed within the housing for cooling the gas in the housing,
means for regulating the temperature within the housing to a particular value on a continuous basis, and
means for providing an additional regulation of the temperature within the housing upon each electrical discharge between the anode and the cathode.

2. In a combination as set forth in claim 1,
the housing being made from a metal and having a homogeneous construction,
the temperature regulating means including a probe disposed within the housing.

3. In a combination as set forth in claim 1,
the temperature regulating means including means disposed within the housing for providing for a flow of water through the housing to cool the gases in the housing.

4. In a combination as set forth in claim 1,
the temperature regulating means including the heater means for heating the housing and means for cooling the housing to regulate the temperature of the gases in the housing to the particular value.

5. In a combination as set forth in claim 1,
the housing being made from a metal having properties of conducting heat and having non-corrosive properties, the housing having a homogeneous construction,
the temperature regulating means including a temperature probe supported on the housing and extending into the housing.

6. In combination,
a housing made from a material having non-corrosive properties and having properties of conducting heat into the housing,
an anode and a cathode disposed in spaced relationship to each other within the housing,
first means associated with the anode and the cathode for periodically producing an electrical discharge between the anode and the cathode,
there being gases in the housing for ionization and chemical reaction,
heater means supported by the housing for heating the housing,
second means disposed within the housing for passing a fluid through the housing to cool the housing,
a probe supported by the housing and extending into the housing for determining the temperature within the housing,
third means responsive to the temperature of the probe for continuously regulating the temperature of the gases within the housing to a particular value, and
fourth means responsive to each electrical discharge between the anode and the cathode for providing for a cooling of the temperature of the gases within the housing to compensate for the heat produced as a result of such electrical discharge.

7. In a combination as set forth in claim 6,
the fourth means being operative to provide for the passage of the fluid through the second means upon each electrical discharge between the anode and the cathode and in accordance with the magnitude of the electrical discharge between the anode and the cathode.

8. In a combination as set forth in claim 7 wherein the housing is made from a metal and the second means passes water through the housing to cool the housing.

9. In a combination as set forth in claim 7 wherein the heater means are supported on the housing externally of the housing.

10. A method of regulating the temperature of a laser including the following steps:
providing a housing with a homogeneous composition,
disposing an anode and a cathode of the laser within the housing,
disposing gases within the housing for ionization and chemical reaction when an electrical discharge is produced between the anode and the cathode,
providing for electrical discharges between the anode and the cathode on a periodic basis, continuously regulating the temperature of the gases within the housing at a particular value, and
additionally regulating the temperature of the gases within the housing upon each electrical discharge between the anode and the cathode.

11. A method as set forth in claim 10, including,
additionally regulating the temperature within the housing in accordance with the magnitude of the electrical discharge between the anode and the cathode.

12. A method as set forth in claim 11 wherein the regulation of the temperature within the housing includes the steps of:
disposing a heater on the housing externally of the housing, and
providing for a flow of water through the housing to cool the gases within the housing.

13. A method as set forth in claim 12 wherein the regulation of the temperature of the gases within the housing includes the steps of:
supporting a probe on the housing and extending the probe into the housing to measure at each instant the temperature of the gases within the housing.

14. In combination in a laser,
a housing having non-corrosive properties,
an anode and a cathode disposed within the housing,
means for providing electrical discharges periodically between the anode and the cathode,
there being gases within the housing for ionization and chemical reaction upon each electrical discharge between the anode and the cathode, and
means for recirculating the gases to clean the gases and for reintroducing the gases to the housing after each circulation,
the recirculating means including a pair of motors having substantially identical characteristics and further including a fan commonly driven by the pair of motors, each of the motors providing a current to rotate the fan,
the recirculating means further including means responsive to the rotational speed of the fan and the currents in the motors to regulate the rotational speed of the fan at a particular value and to regulate the currents in the motors.

15. In a combination as set forth in claim 14,
the regulating means being operative to maintain the currents in the motors at substantially equal values while regulating the rotational speed of the fan at the particular value.

16. In a combination as set forth in claim 15,
the pair of motors and the fan having a common shaft, and
means associated with each of the motors for preventing the electrical discharge between the anode and the cathode from affecting the operation of such motor.

17. In a combination as set forth in claim 16,
means associated with each of the motors for minimizing shocks and vibrations in the shaft common to the motors.

18. In a combination as set forth in claim 17,
means for regulating the temperatures of the gases within the housing at a particular value.

19. In combination,
a housing made from a material having non-corrosive properties, an anode and a cathode disposed in the housing in spaced relationship, means for producing an electrical discharge periodically between the anode and the cathode, there being gases in the housing for ionization and chemical reaction upon the occurrence of the electrical discharges between the anode and the cathode, means for regulating the temperature of the gases within the housing continuously at a particular value, means for additionally regulating the temperature of the gases within the housing in accordance with the occurrence and the magnitude of the electrical discharge between the anode and the cathode, means including a pair of motors and at least one fan on a common shaft for recirculating the gases in the housing, the motors providing a current for driving the fan, means for filtering the gases in the housing during the recirculation of the gases, and means for regulating the speeds of the motors and the currents through the motors to provide substantially equal contributions from the motors in driving the fan at a particular speed.

20. In a combination as set forth in claim 19, the temperature regulating means including a probe in the housing and a heater supported on the housing exterior to the housing and means for recirculating a fluid through the housing to cool the housing.

21. In a combination as set forth in claim 20, the speed regulating means including a microprocessor for receiving indications representing the speeds of the motors and the currents through the motors and for operating upon the indications of the speeds and the currents for regulating the speeds of the motors at the particular value and the currents through the motors at substantially equal values.

22. In a combination as set forth in claim 20, the housing being made from a metal, the speed regulating means including a microprocessor for receiving indications representing the speeds of the motors and the currents through the motors and for operating upon the indications of the speeds and the currents for regulating the speeds of the motors at the particular value and the currents through the motors at substantially identical values, the temperature regulating means including means for producing an increased circulation of the fluid through the housing upon the occurrence of each electrical discharge between the anode and the cathode and in accordance with the magnitude of each such electrical discharge.

23. In combination, a housing, an anode and a cathode disposed in the housing in spaced relationship to each other, means for providing electrical discharges periodically between the anode and the cathode, there being gases in the housing for ionization by the electrical discharges between the anode and the cathode and for chemical reaction after such ionization, and means for regulating the concentration of at least one of the gases in the housing to obtain an optimum efficiency in the ionization of the gases and the chemical reaction between the gases, the regulating means being operative to count the number of the periodic electrical discharges between the anode and the cathode and to introduce increments of the at least one of the gases into the housing in accordance with such count.

24. In a combination as set forth in claim 23, the regulating means including means for measuring the energy obtained from the chemical reaction of the gases upon each electrical discharge between the anode and the cathode, the gases having properties of producing an optimal energy from the chemical reaction of the gases upon each electrical discharge when the at least one of the gases has a particular concentration in the housing, the regulating means being operative to introduce the at least one gas into the housing until the at least one gas has a concentration slightly greater than the particular concentration in the housing and being operative to prevent any further introduction of the at least one gas into the housing until the at least one gas in the housing has a concentration slightly less than the particular concentration.

25. In a combination as set forth in claim 24, means for maintaining the temperature within the housing at a particular value, and means for recirculating the gases in the housing and for filtering the gases during such circulation.

26. In a combination as set forth in claim 25, the gases in the housing being krypton and fluorine to obtain a chemical reaction for the production of krypton fluoride, and the regulating means being operative to regulate the concentration of fluorine in the housing at substantially the particular concentration.

27. In a combination as set forth in claim 23, the regulating means being operative to introduce the at least one gas into the housing without withdrawing any of the gases from the housing.

28. In a combination as set forth in claim 23, the gases having properties of producing an optimal energy upon each chemical reaction when the one gas in the housing has the particular concentration, the regulating means being operative to introduce only the one gas in increments into the housing until the concentration of the one gas in the housing has produced the optimal energy in the chemical reaction and has thereafter produced a decrease in the optimal energy in the chemical reaction and to interrupt the introduction of only the one gas into the housing until the concentration of the one gas in the housing has produced the optimal energy in the chemical reaction and has thereafter produced a decrease in the optimal energy in the chemical reactions.

29. In combination, a housing, an anode and a cathode disposed in the housing in spaced relationship to each other, means for providing electrical discharges periodically between the anode and the cathode, there being gases in the housing for ionization by the electrical discharges between the anode and the cathode and for chemical reaction after such ionization, means for regulating the concentration of at least one of the gases in the housing to obtain an optimum efficiency in the ionization of the gases and the chemical reaction between the gases, the regulating means including means for measuring the energy obtained from the chemical reaction of the gases upon each electrical discharge between the anode and the cathode, the regulating means further including means for introducing the at least one of the gases in increments until the at least one of the gases produces an optimum energy in each chemical reaction and for introducing the at least one of the gases in increments for a short time thereafter until the energy in the chemical reactions starts to decline from the optimum value, and the regulating means being operative to prevent any further introduction of the at least one of the gases into the housing until the energy from the chemical reaction has reached the optimum value and has decreased slightly from this optimum value.

30. In combination, a housing having non-corrosive properties, an anode and a cathode disposed in the housing in spaced relationship, means for providing electrical discharges periodically between the anode and the cathode, there being gases in the housing for ionization and chemical reaction upon each electrical discharge between the anode and the cathode, the gases having properties of providing an optimal energy upon each chemical reaction when the concentration of at least one of the gases in the housing is at a particular value, means for regulating the concentration of the at least one gas in the housing at the particular value in accordance with the amount of energy in each chemical reaction, means for regulating the temperature of the gases within the housing continuously at a particular value, and means for providing an additional regulation of the temperature of the gases within the housing upon each occurrence of an electrical discharge between the anode and the cathode.

31. In a combination as set forth in claim 30, the concentration regulating means including means for introducing the at least one gas into the housing until the amount of energy in each chemical reaction starts to decrease and for interrupting the introduction of the at least one gas into the housing until the amount of energy in each chemical reaction starts to decrease.

32. In a combination as set forth in claim 31, the housing being closed and being made from a single material having heat conductive properties, the temperature regulating means including a probe supported by the housing and extending into the housing for measuring the temperature within the housing and further including means supported by the housing externally of the housing for heating the gases in the housing and further including means disposed within the housing for passing a fluid through the housing to cool the gases in the housing.

33. In a combination as set forth in claim 31, means for recirculating the gases in the housing, and means for filtering the gases during such recirculation.

34. In combination, a housing having non-corrosive properties, an anode and a cathode disposed within the housing in spaced relationship to each other, means for producing electrical discharges periodically between the anode and the cathode, there being gases within the housing for ionization and chemical reaction upon each electrical discharge between the cathode and the anode, means for regulating the concentration of at least one of the gases in the housing at a particular value in accordance with the energy produced in each chemical reaction, the regulating means being operative to introduce the at least one gas into the housing without withdrawing any of the gases from the housing.

35. In a combination as set forth in claim 34, means for recirculating the gases in the housing, and means for filtering the gases during such recirculation.

36. In a combination as set forth in claim 35, means for continuously regulating the temperature of the gases within the housing at a particular value, and means for further regulating the temperature within the housing upon each occurrence of an electrical discharge between the anode and the cathode and in accordance with the energy in such electrical discharge.

37. In a combination as set forth in claim 36, a heater supported by the housing externally of the housing, means disposed within the housing for passing a fluid through the housing to cool the gases in the housing, a probe supported by the housing and extending into the housing, the housing being homogeneous and being made from a material having heat conductive properties, means including the heater, the fluid means and the probe for continuously regulating the temperature of the gases in the housing at a particular value, and means including the fluid means for regulating the temperature of the gases in the housing upon each occurrence of an electrical discharge between the anode and the cathode and in accordance with the energy in such electrical discharge.

38. In a combination, a housing having non-corrosive properties, an anode and a cathode disposed within the housing in spaced relationship to each other, means for producing electrical discharges periodically between the anode and the cathode, there being gases within the housing for ionization and chemical reaction upon each electrical discharge between the cathode and the anode, means for regulating the concentration of at least one of the gases in the housing at a particular value in accordance with the energy produced in each chemical reaction, the gases having properties of producing an optimal energy upon each chemical reaction when the one gas in the housing has the particular concentration, the regulating means being operative to introduce only the one gas in increments into the housing until the concentration of the one gas in the housing has produced the optimal energy in the chemical reaction and has thereafter produced a decrease in the optimal energy in the chemical reaction and to interrupt the introduction of only the one gas into the housing until the concentration of the one gas in the housing has produced the optimal energy in the chemical reaction and has thereafter produced a decrease in the optimal energy in the chemical reactions.

39. In a combination as recited in claim 38,
the regulating means being operative to introduce the one gas into the housing without withdrawing any of the gases from the housing.

40. In combination,
a housing having non-corrosive properties,
an anode and a cathode disposed within the housing in spaced relationship to each other,
means for producing electrical discharges periodically between the anode and the cathode,
there being gases within the housing for ionization and chemical reaction upon each electrical discharge between the cathode and the anode,
means for regulating the concentration of at least one of the gases in the housing at a particular value in accordance with the energy produced in each chemical reaction,
the gases having properties of producing an optimal energy upon each chemical reaction when the one gas in the housing has the particular concentration,
the regulating means being operative to introduce the at least one gas in increments into the housing until the concentration of the at least one gas in the housing has produced the optimal energy in the chemical reaction and has thereafter produced a decrease in the optimal energy in the chemical reaction and to interrupt the introduction of the at least one gas into the housing until the concentration of the at least one gas in the housing has produced the optimal energy in the chemical reaction and has thereafter produced a decrease in the optimal energy in the chemical reactions,
means for recirculating the gases in the housing, and
means for filtering the gases during such recirculation,
the recirculating means including a pair of motors each operative to produce a current and to produce a driving force in accordance with such current and further including at least one fan commonly driven rotationally by the motors and further including means for regulating the operation of the motors to obtain the rotation of the fan at a particular speed and to obtain substantially equal currents in the motors.

41. In combination,
a housing,
an anode and a cathode disposed in the housing in a spaced relationship,
means for applying voltage pulses between the anode and the cathode to produce an electrical discharge between the anode and the cathode,
there being gases disposed in the housing relative to the anode and the cathode to become ionized and chemically reactive as a result of the electrical discharge between the anode and the cathode,
means for providing a flow of a fluid past the voltage pulse means to cool the voltage pulse means,
means for recirculating the fluid to provide for a cooling of the fluid after moving the fluid past the voltage pulse means, and
means for cooling the fluid during the fluid recirculation.

42. In a combination as set forth in claim 41,
the voltage pulse means including at least one capacitor and including means for triggering the discharge of the at least one capacitor and further including means responsive to the charge in the at least one capacitor for providing for the operation of the triggering means,
the cooling means for the voltage pulse means including means for providing for the flow of the cooling fluid past the capacitor, the triggering means and the means for providing for the operation of the triggering means.

43. In a combination as set forth in claim 42,
means for providing for a flow of a portion of the cooling fluid past the triggering means, and
means for providing for a flow of another portion of the cooling fluid past the means for providing for the operation of the triggering means.

44. In a combination as set forth in claim 42,
the triggering means including a thyratron,
a chimney made from a dielectric material and enveloping the thyratron,
means for providing for a flow of a portion of the cooling fluid between the thyratron and the dielectric chimney,
a circuit board being included in the means for providing for the operation of the triggering means, and
means for providing for a flow of another portion of the cooling fluid past the circuit board.

45. In combination,
a housing,
an anode and a cathode disposed in the housing in spaced relationship to each other,
means for producing voltage pulses periodically between the anode and the cathode to provide an electrical discharge between the anode and the cathode,
there being gases in the housing for ionization and chemical reaction as a result of the electrical discharges,
means for providing for a recirculation of the gases through the housing,
means for providing a filtering of the gases during the recirculation of the gases,
means for providing for the flow of a cooling fluid past the pulse-producing means,
the voltage pulse-producing means including at least one capacitor,
means for triggering the discharge of the capacitor,
means for providing for an operation of the triggering means,
means for providing a recirculation of the cooling fluid, and
means for cooling the cooling fluid during the recirculation of the cooling fluid.

46. In a combination as set forth in claim 45,
means for producing the flow of the fluid past the at least one capacitor,
means associated with the triggering means for insulating the triggering means and for co-operating with the triggering means in providing for a flow of the portion of the fluid past the triggering means after the flow of the fluid past the at least one capacitor, and means for diverting another portion of the fluid from the flow past the triggering means and for providing for the flow of such other portion of the fluid past the means for providing for the operation of the triggering means.

47. In a combination as set forth in claim 46, the means for providing for the operation of the triggering means being disposed on a circuit board, and means for providing the flow of the other portion being operative to guide the other portion of the fluid past the circuit board.

48. In a combination as set forth in claim 45, means for providing for a flow of a first portion of the cooling fluid past the triggering means, and means for providing for the flow of another portion of the cooling fluid past the means for providing for the operation of the triggering means.

49. In combination, a housing, an anode and a cathode disposed in spaced relationship in the housing, means for introducing a voltage pulse periodically between the cathode and the anode to provide for an electrical discharge between the anode and the cathode, there being gases in the housing for ionization and chemical reaction as a result of the electrical discharge between the anode and the cathode, means for regulating the concentration of at least one of the gases in the housing to obtain an optimal energy in the ionization and chemical reaction of the gases, means for recirculating the gases, means for filtering the gases during the recirculation of the gases, means for moving a fluid past the voltage pulse means to cool the voltage pulse means, means for recirculating the cooling fluid after the movement of the cooling fluid past the voltage pulse means, and means for cooling the fluid during the recirculation of the fluid.

50. In a combination as set forth in claim 49, the gases producing an optimal amount of energy in each ionization and chemical reaction when the at least one gas has a particular concentration, the means for regulating the concentration of the gases including means for providing for the introduction of the at least one gas into the housing until the concentration of the at least one gas in the housing is greater than the concentration for producing the optimal amount of energy in each ionization and chemical reaction of the gases and for thereafter interrupting the introduction of the at least one gas into the housing until the concentration of the at least one gas in the housing is less than the concentration for producing the optimal amount of energy in each ionization and chemical reaction of the gases, and means for measuring the amount of the energy in each ionization and chemical reaction.

51. In a combination as set forth in claim 49, the voltage pulse means including at least one capacitor, means for triggering the discharge of the at least one capacitor and means for providing for the operation of the triggering means, the fluid moving means providing for a movement of the fluid past the capacitor to cool the capacitor, a movement of a portion of the fluid past the triggering means to cool the triggering means and a movement of another portion of the fluid past the means for providing for the operation of the triggering means to cool such means.

52. In a combination as set forth in claim 51, the gases producing an optimal amount of energy upon each ionization and chemical reaction when the at least one gas has a particular concentration, the means for regulating the concentration of the gases including means for providing for the introduction of the at least one gas into the housing until the concentration of the at least one gas in the housing is greater than the concentration for producing the optimal amount of energy in each ionization and chemical reaction of the gases and for thereafter interrupting the introduction of the at least one gas into the housing until the concentration of the at least one gas in the housing is less than the concentration for producing the optimal amount of energy in each ionization and chemical reaction of the gases, and means for measuring the amount of the energy in each ionization and chemical reaction to determine whether the at least one gas should be introduced into the housing.

53. In a combination as set forth in claim 52, the triggering means including a thyratron and a dielectric chimney enveloping the thyratron, the cooling means for the triggering means providing for the movement of the portion of the fluid between the thyratron and the chimney, the cooling means for the triggering means providing for the movement of the another portion of the fluid outside of the chimney and past the chimney.

54. In a combination as set forth in claim 51, the thyratron having a filament, means for passing an electrical current through the thyratron filament, the cooling means for the triggering means providing a movement of another portion of the fluid past the current means for the thyratron filament to cool such current means.

55. In a combination as set forth in claim 54, the capacitor discharge means including a thyratron and a filament in the thyratron, the voltage pulse means including a power supply for heating the thyratron filament, the power supply for the thyratron filament being disposed in the path of movement of the another portion of the fluid, means for recirculating the cooling fluid, and means for cooling the cooling fluid during the recirculation.

56. In combination, a housing having heat conducting properties, an anode and a cathode disposed in a spaced relationship in the housing, means for producing a voltage pulse between the anode and the cathode to provide an electrical discharge between the anode and the cathode, there being gases in the housing for ionization and chemical reaction upon the occurrence of the electrical discharge between the anode and the cathode, means for providing a recirculation of the gases, means for filtering the gases during the recirculation of the gases, a heater supported on the housing externally of the housing, means disposed in the housing for cooling the gases in the housing, means for regulating the temperature of the housing continuously at a particular value by selective operations of the heater and the cooling means, means for further regulating the temperature of the gases within the housing in accordance with the electrical discharges in the housing, and means for moving a cooling fluid past the voltage pulse means to cool the voltage pulse means.

57. In a combination as set forth in claim 56, the voltage pulse means including at least one capacitor, means for providing a triggering of the at least one capacitor and means for providing for an operation of the triggering means, the cooling means for the voltage pulse means including means for moving the cooling fluid past the at least one capacitor, means for providing for a movement of a portion of the fluid past the triggering means and means for providing a movement of another portion of the fluid past the means for providing for an operation of the triggering means.

58. In a combination as set forth in claim 56, means for recirculating the cooling fluid, and means for cooling the cooling fluid during the recirculation.

59. In combination, a housing, an anode and a cathode disposed in the housing in a spaced relationship, means for producing a voltage pulse between the anode and the cathode to provide an electrical discharge between the anode and the cathode, there being gases in the housing for ionization and chemical reaction upon each occurrence of the electrical discharge, means for providing for a recirculation of the gases in the housing, means for providing for a movement of a fluid past the voltage pulse means to cool the voltage pulse means, means for providing for a recirculation of the cooling fluid, and means for providing for a cooling of the cooling fluid during such recirculation.

60. In a combination as set forth in claim 59, the recirculating means for the gases including a pair of motors and a fan and a shaft on which the fan and the motors are mounted, and means for providing for a rotation of the shaft at a particular speed and for providing for substantially equal excitations in the motor.

61. In a combination as recited in claim 60, the amount of energy produced in each ionization and chemical reaction of the gases in the housing occurring at a particular concentration of one of the gases, and means for providing alternately for the introduction of the one gas in the housing to a concentration greater than the particular concentration and the consumption of the gases until a concentration less than the particular concentration.

62. In a combination as set forth in claim 59, means for regulating the concentration of at least one of the gases in the housing to obtain optimal energy from each ionization and chemical reaction of the gases in the housing.

63. In a combination as set forth in claim 62, the regulating means being operative to introduce the at least one gas into the housing without withdrawing any of the gases from the housing.

64. In a combination as set forth in claim 62, the regulating means being operative to count the number of the periodic electrical discharges between the anode and the cathode and to introduce increments of the at least one of the gases into the housing in accordance with such count.

65. In a combination as set forth in claim 62, the regulating means being operative to introduce only the one gas in increments into the housing until the concentration of the one gas in the housing has produced the optimal energy in the chemical reaction and has thereafter produced a decrease in the optimal energy in the chemical reaction and to interrupt the introduction of only the one gas into the housing until the concentration of the one gas in the housing has produced the optimal energy in the chemical reaction and has thereafter produced a decrease in the optimal energy in the chemical reactions.

66. In combination, a housing, an anode disposed in the housing, a cathode disposed in the housing in displaced relationship to the anode, means for providing a voltage on the cathode to obtain an electrical discharge between the anode and the cathode, the voltage means being disposed in a compartment in the housing, dielectric means disposed in the compartment and disposed relative to the voltage means for insulating the voltage means, there being a tendency for the voltage means to produce ozone in the compartment because of the voltage provided by the voltage means in the compartment, and means for purging the compartment with an inert gas to eliminate any ozone from the compartment.

67. In a combination as set forth in claim 66, the voltage means including a plurality of first conductive members disposed in a spaced relationship, the dielectric means including a plurality of bushings maintaining the first conductive members in a spaced relationship and insulating the conductive members from one another, and an additional conductive member coupled to the first conductive members and receiving the voltage applied to the first conductive members and applying the voltage to the cathode.

68. In a combination as set forth in claim 66, means for circulating the inert gas through the compartment for exhaustion to the atmosphere, and means for introducing a fresh supply of inert gas to the compartment to replace the inert gas in the compartment.

69. In a combination as set forth in claims. 68, the circulating means including a conduit extending through the housing to introduce the inert gas into the compartment.

70. In a combination as set forth in claims 68,
the circulating means including a hose,
a high voltage lead disposed in the hose, and
coupling means at the end of the hose for coupling the hose to the housing,
the high voltage lead being coupled into the housing for introduction to the cathode when the hose is coupled to the housing, and
means for grounding the high voltage lead when the hose is not coupled to the housing.

71. In combination,
a housing,
means for providing a conduit through the housing,
an anode in the housing,
a cathode in the housing in spaced relationship to the anode,
means for providing voltage pulses to the cathode to produce an electrical discharge between the anode and the cathode,
there being gases in the housing for ionization by the electrical discharges and for chemical reaction,
a compartment disposed in coupled relationship to the conduit,
means disposed in the compartment and including the voltage means for introducing the voltage to the cathode,
there being a tendency for the last mentioned means to produce ozone in the compartment as a result of the voltage pulses introduced to the voltage means, and
means associated with the conduit for passing an inert gas through the conduit and into the compartment to purge the ozone in the compartment.

72. In a combination as set forth in claim 71,
means including a hose for circulating the inert gas from the compartment through the hose and to the atmosphere, and
means disposed in the hose for introducing the voltage pulses through the hose into the housing for introduction to the cathode.

73. In a combination as set forth in claim 71,
means for regulating the concentration of at least one of the gases in the housing to obtain an optimal energy from the ionization of the gases and the chemical reaction of the gases upon each electrical discharge between the cathode and the anode.

74. In a combination as set forth in claim 71,
means for continuously regulating the temperature of the gases in the housing at a particular value, and
means for providing a further regulation of the temperature of the gases in the housing upon each electrical discharge between the anode and the cathode.

75. In a combination as set forth in claim 74,
a heater disposed on the housing,
means for recirculating the gases in the housing,
means for filtering the gases during the recirculation,
means for cooling the gases in the housing,
the temperature regulating means including the heater and the cooling means.

76. In combination,
a housing,
a cathode in the housing,
an anode in the housing in spaced relationship to the cathode,
means for applying voltage pulses between the anode and the cathode to produce electrical discharges between the anode and the cathode,
there being gases in the housing for ionization by the electrical discharges and for chemical reaction upon such ionization,
a hose,
a grounded covering for the housing,
an electrically conductive sleeve movably disposed on the hose,
a high voltage contact at the end of the sleeve,
an electrically conductive spring disposed on the hose and coupled to the sleeve and the grounded covering and constrained to move the spring into engagement with the contact,
means disposed on the housing for engaging the sleeve to provide for a movement of the contact into the housing and to prevent the movement of the sleeve into the housing with the contact, and
means extending from the contact to the voltage means to provide for the introduction of the voltage from the contact to the voltage means when the contact is inserted into the housing.

77. In a combination as set forth in claim 76,
an electrical conductor extending through the hose and engaging the contact, and
means for applying a voltage to the electrical conductor.

78. In a combination as set forth in claim 77,
a grounded retainer having a pocket for receiving the end of the hose with the contact when the contact is not coupled into the housing, and
means for providing for a swivelling of the hose to provide for the disposition into the pocket in the retainer of the end of the hose with the contact.

79. In a combination as set forth in claim 76,
a compartment in the housing,
the voltage means being disposed in the compartment and having a tendency to produce ozone in the compartment upon the production of the voltage pulses, and
means including the hose for providing for the purging of the ozone in the compartment.

80. In a combination as recited in claim 79,
the purging means providing for the introduction of an inert gas into the compartment and for the circulation of the inert gas from the compartment.

81. In a combination as set forth in claim 80,
the inert gas being nitrogen and the purging means providing for the purging of the inert gas to the atmosphere after the movement of the inert gas through the compartment,
an electrical conductor extending through the hose and engaging the contact, and
means for applying a voltage to the electrical conductor.

82. In combination,
a housing,
an anode in the housing,
a cathode in the housing in spaced relationship to the anode,
voltage means for applying voltage pulses to the cathode to obtain electrical discharges between the cathode and the anode,
there being gases in the housing for ionization and chemical reaction in accordance with the electrical discharges between the anode and the cathode, means for regulating the concentration of at least one of the gases in the housing to obtain an optimal amount of energy in each ionization and chemical reaction of the gases, a compartment, the voltage means being disposed in the compartment, there being a tendency for the voltage means to produce ozone in the compartment in accordance with the application of the voltage pulses by the voltage means to the cathode, and means for directing a fluid under pressure through the compartment for the purging of the ozone in the compartment.

83. In a combination as set forth in claim 82, the directing means providing for the passage of an inert gas under pressure through the compartment to obtain the purging of the ozone in the compartment.

84. In a combination, a housing, an anode in the housing, a cathode in the housing in spaced relationship to the anode, voltage means for applying voltage pulses to the cathode to obtain electrical discharges between the cathode and the anode, there being gases in the housing for ionization and chemical reaction in accordance with the electrical discharges between the anode and the cathode, means for regulating the concentration of at least one of the gases in the housing to obtain an optimal amount of energy in each ionization and chemical reaction of the gases, a compartment, the voltage means being disposed in the compartment, there being a tendency for the voltage means to produce ozone in the compartment in accordance with the application of the voltage pulses by the voltage means to the cathode, and means for providing for the purging of the ozone in the compartment, means for continually regulating the temperature of the gases in the housing to a particular value, and means for additionally regulating the temperature of the gases in the housing upon the introduction of each voltage pulse to the cathode and in accordance with the magnitude of such voltage pulse.

85. In a combination as set forth in claim 84, the purging means including means for circulating an inert gas through the compartment, the circulating means including a hose, and means disposed in the hose for introducing into the housing the voltage pulses for introduction to the cathode to obtain the production of the voltage pulses between the anode and the cathode.

86. In a combination as set forth in claim 85, the means for introducing the voltage pulses into the housing including a wire disposed in the hose and also including a contact at the end of the hose for insertion into the housing and further including means for providing an electrical ground and resiliently disposed on the hose in engagement with the contact before the insertion of the hose into the housing and movable from the contact upon the insertion of the contact into the housing.

87. In a combination as set forth in claim 86, a grounded covering on the hose, and a spring disposed on the hose and engaging the grounded covering at one end and the resiliently disposed means at the other end.

88. In a combination as set forth in claim 87, the housing being made from a material having heat conductive properties, means disposed on the housing externally of the housing for heating the housing, means for recirculating the gases in the housing, means for filtering the gases during the recirculation, means for cooling the gases in the housing, a probe extending into the housing for determining the temperature of the gases in the housing, the temperature regulating means including the probe, the heating means and the cooling means.

89. In combination, a housing, a cathode in the housing, an anode in the housing in spaced relationship to the cathode, means for applying voltage pulses between the anode and the cathode to produce an electrical discharge between the anode and the cathode, there being gases in the housing for ionization and chemical reaction upon each electrical discharge, a compartment, means disposed in the compartment for providing voltage pulses between the anode and the cathode to obtain the electrical discharge, means for continuously regulating the temperature of the gases in the housing at a particular value, means for additionally regulating the temperature of the gases in the housing in accordance with the occurrence and the magnitude of each voltage pulse, and means for purging any ozone produced in the compartment by the voltage applied to the voltage means.

90. In a combination as set forth in claim 89, the purging means including means for passing an inert gas through the compartment to remove any ozone in the compartment.

91. In a combination as set forth in claim 89, the purging means including means for passing an inert gas through the housing into the compartment and through the compartment to obtain a removal of any ozone from the compartment, the gas-passing means including a hose for receiving the inert gas after the passage of the inert gas through the compartment for introducing the inert gas into the housing for exhaustion to the atmosphere, and means disposed in the hose for introducing the voltage pulses into the housing for introduction to the cathode.

92. In a combination as set forth in claim 91, the means for applying the voltage pulses including a contact for insertion into the housing to provide the voltage pulses between the anode and the cathode, a grounded shield disposed on the hose, a sleeve movably disposed on the hose in electrical continuity with the grounded shield, and means associated with the sleeve and the grounded sleeve on the hose for providing for the positioning of the sleeve in engagement with the contact when the hose is in uncoupled relationship to the housing and for providing for the displacement of the sleeve from the housing when the hose is coupled to the housing.

93. In a combination as set forth in claim 92, a grounded retainer having a pocket for receiving the end of the hose with the contact when the contact is not coupled into the housing, and means for providing for a swivelling of the hose to provide for the disposition into the retainer pocket of the end of the hose with the contact.

94. In combination, a housing, an anode in the housing, a cathode in the housing in spaced relationship to the anode, voltage means for applying voltage pulses to the cathode to obtain electrical discharges between the cathode and the anode, there being gases in the housing for ionization and chemical reaction in accordance with the electrical discharges between the anode and the cathode, means including a hose for providing an inert gas, and means disposed in the hose for introducing into the housing the voltage pulses for introduction to the cathode to obtain the electrical discharges between the anode and the cathode.

95. In a combination as set forth in claim 94, the means for introducing the voltage pulses into the housing including a wire disposed in the hose and electrically insulated by the inert gas in the hose.

96. In a combination as set forth in claim 95, the means for introducing the voltage pulse into the housing also including a contact at the end of the hose for insertion into the housing and further including means for providing an electrical ground and resiliently disposed on the hose in engagement with the contact before the insertion of the hose into the housing and movable from the contact upon the insertion of the contact into the housing.

97. In a combination as set forth in claim 96, a grounded covering on the hose, and a spring disposed on the hose and engaging the grounded covering at one end and the resiliently disposed means at the other end.

* * * * *